US011873987B2

(12) United States Patent
Fedorov

(10) Patent No.: US 11,873,987 B2
(45) Date of Patent: Jan. 16, 2024

(54) SYSTEMS AND METHODS FOR CONTROLLING A LINEAR OPTICAL PROJECTION DEVICE BASED ON SIGNALS FROM RECEIVED FROM A SENSOR

(71) Applicant: PHOTONIC ENDEAVOURS INC., North York (CA)

(72) Inventor: Dimitry Fedorov, Toronto (CA)

(73) Assignee: PHOTONIC ENDEAVOURS INC., North York (CA)

( * ) Notice: Subject to any disclaimer, the term of this patent is extended or adjusted under 35 U.S.C. 154(b) by 0 days.

(21) Appl. No.: 17/961,670

(22) Filed: Oct. 7, 2022

(65) Prior Publication Data

US 2023/0029569 A1 Feb. 2, 2023

Related U.S. Application Data

(63) Continuation of application No. 17/037,174, filed on Sep. 29, 2020, now Pat. No. 11,466,837.

(Continued)

(51) Int. Cl.
*F21V 5/00* (2018.01)
*F21V 5/04* (2006.01)
(Continued)

(52) U.S. Cl.
CPC .............. *F21V 5/008* (2013.01); *F21V 5/043* (2013.01); *F21V 5/045* (2013.01); *F21V 14/06* (2013.01); *F21V 17/002* (2013.01); *F21V 23/003* (2013.01); *F21V 23/0471* (2013.01); *F21W 2111/02* (2013.01); *F21W 2131/402* (2013.01); *F21Y 2113/13* (2016.08); *F21Y 2115/10* (2016.08)

(58) Field of Classification Search
CPC .......... F21V 5/008; F21V 5/043; F21V 5/045; F21V 14/06; F21V 17/002; F21V 23/003; F21V 23/0471; F21W 2111/02; F21W 2131/402; F21Y 2113/13; F21Y 2115/10; G03B 21/12; G03B 21/2013; G03B 21/2033; G09F 19/22; G09F 19/18; G06Q 10/08
See application file for complete search history.

(56) References Cited

U.S. PATENT DOCUMENTS 11,466,837 B2 * 10/2022 Fedorov ................. G03B 21/12
2007/0268700 A1 * 11/2007 Hough .................... F21V 5/008
362/268

(Continued)

*Primary Examiner* — Tracie Y Green
(74) *Attorney, Agent, or Firm* — HILL & SCHUMACHER

(57) ABSTRACT

An optical projection device for projecting a linear image is disclosed. Light emitted by an array of light emitting diodes arranged along an array axis is focused in at least a direction perpendicular to the array axis and diffused in a direction parallel to the array axis, thereby generating a linear image in which light from adjacent light emitting diodes is spatially overlapped. In some embodiments, the focusing and diffusion of the light is performed by a Fresnel lens and a lenticular lens, respectively. The optical projection device may be employed to virtually mark a surface, such as a floor in an industrial setting. High power light emitting diodes may be employed to generate a linear image having an illuminance of at least 4000 lux that is focused to a distance between 7.5 and 20 feet.

32 Claims, 19 Drawing Sheets

Related U.S. Application Data

(60) Provisional application No. 62/908,246, filed on Sep. 30, 2019.

(51) Int. Cl.
| | | |
|---|---|---|
| *F21V 14/06* | (2006.01) | |
| *F21V 17/00* | (2006.01) | |
| *F21V 23/00* | (2015.01) | |
| *F21V 23/04* | (2006.01) | |
| *F21W 131/402* | (2006.01) | |
| *F21Y 115/10* | (2016.01) | |
| *F21Y 113/13* | (2016.01) | |
| *F21W 111/02* | (2006.01) | |

(56) References Cited

U.S. PATENT DOCUMENTS

2016/0249426 A1\* 8/2016 Holtman ................ H05B 45/60
2022/0100072 A1\* 3/2022 Yokoo ................ G03B 21/2033

\* cited by examiner

SYSTEMS AND METHODS FOR CONTROLLING A LINEAR OPTICAL PROJECTION DEVICE BASED ON SIGNALS FROM RECEIVED FROM A SENSOR

CROSS-REFERENCE TO RELATED APPLICATION

This application claims priority to U.S. Provisional Patent Application No. 62/908,246, titled "LINEAR OPTICAL PROJECTION DEVICE AND METHOD OF USE THEREOF" and filed on Sep. 30, 2019, the entire contents of which is incorporated herein by reference.

BACKGROUND

The present disclosure relates to optical projection and methods for the virtual marking of surfaces. More particularly, the present disclosure relates to the optical projection of linear images for virtual marking applications.

In industrial and warehousing settings, lines are often painted or taped onto floor surfaces to demarcate areas, designate walkways, guide vehicles, or to indicate hazard zones. Unfortunately, painting and taping have been found to be impractical because surfaces are typically subject to abrasion, resulting in the frequent need to repaint or retape the lines. This results in reduced effectiveness or safety once the lines have faded. Re-application of lines also requires partial facility shut down to pretreat and then repaint or retape the surface. This can be extremely costly to an organization and can lead to increased liability if accidents happen due to a lack of line maintenance. Painted and taped lines are also ineffective in industrial settings (recycling plants, mining and material processing operations, etc.) in which material is often moved and prone to being spilled on the floor, as material can cover up the lines. Lastly, many industrial environments, such as warehouse facilities, are now often modular and can require frequent re-configuration and re-purposing. Stripping paint or removing tape from floors can be costly and time-consuming and can result in reduced efficiency due to area shut down.

Optical virtual marking has been proposed as a solution that overcomes many of the problems with traditional painted or taped lines. Two different optical configurations have been employed, namely laser line projection and shadow lens (Gobo) projection. While initially appearing to be an effective solution, lasers can introduce new problems, such as generating an eye hazard due to the highly concentrated and spatially coherent nature of laser light. Indeed, the intensity needed to produce a well-defined and visible line using a laser typically requires hazardous levels of laser intensity. This hazard also introduces regulatory issues, as each jurisdiction has its own laser regulations, making it difficult to implement laser-based solutions. Another drawback of lasers is their limited operating lifetime.

The other known optical solution involving a shadow lens (Gobo) projector also suffers from significant drawbacks, such as the limited projection angle that they are capable of providing, with most Gobo projectors being limited to a projection angle of less than 45 degrees. This limitation, when combined with the cost of such a projector, results in a high cost-per-meter of projected line. Furthermore, due to masking out the "blank" or "non-projecting" areas of the image plane that is inherent to the design of a shadow lens projector, such projectors and inefficient in their use of generated light or electricity, often requiring 300 W or more to project a line of only a small fraction of that optical power.

SUMMARY

An optical projection device for projecting a linear image is disclosed. Light emitted by an array of light emitting diodes arranged along an array axis is focused in at least a direction perpendicular to the array axis and diffused in a direction parallel to the array axis, thereby generating a linear image in which light from adjacent light emitting diodes is spatially overlapped. In some embodiments, the focusing and diffusion of the light is performed by a Fresnel lens and a lenticular lens, respectively. The optical projection device may be employed to virtually mark a surface, such as a floor in an industrial setting. High power light emitting diodes may be employed to generate a linear image having an illuminance of at least 4000 lux that is focused to a distance between 7.5 and 20 feet.

Accordingly, in a first aspect, there is provided a method of forming a virtual optical marking on a surface, the method comprising:
  providing an optical projection device comprising:
    a housing;
    a linear array of light emitting diodes supported by the housing, the linear array of light emitting diodes defining an array axis intersecting each light emitting diode; and
    at least one optical component supported by the housing, the at least one optical component being configured to focus light emitted from the linear array of light emitting diodes and generate a linear image having an image axis parallel to the array axis, wherein the linear image is generated such that light from adjacent light emitting diodes is spatially overlapped and diffused in a length direction that is parallel to the image axis, and such that the light is focused along a width direction that is perpendicular to the image axis; and
  supporting the housing relative to the surface such that the linear image is formed on the surface, thereby virtually marking the surface with the linear image.

In some example implementations of the method, the optical projection device is absent of an image mask device between the linear array of light emitting diodes and the at least one optical component.

In some example implementations of the method, at least one optical component is configured to collect and transmit the light from the linear array of light emitting diodes such that at least 25% of an optical power emitted by the linear array of light emitting diodes is transmitted to form the linear image.

In some example implementations of the method, at least one light emitting diode is a high-power light emitting diode consuming an electrical power of at least 5 W.

In some example implementations of the method, a distance between a distal end of the optical projection device and the linear image formed on the surface is between 7.5 and 60 feet.

In some example implementations of the method, a distance between a distal end of the optical projection device and the linear image formed on the surface is between 7.5 and 40 feet.

In some example implementations of the method, a distance between a distal end of the optical projection device and the linear image formed on the surface is between 7.5 and 22.5 feet and an illuminance of the linear image is at least 4000 lux.

In some example implementations of the method, a distance between a distal end of the optical projection device and the linear image formed on the surface is between 7.5 and 22.5 feet and an illuminance of the linear image is at least 10000 lux.

In some example implementations of the method, at least one optical component is configured such that a length of the linear image exceeds a length of an output aperture of said at least one optical component by at least a factor of 10.

In some example implementations of the method, at least one optical component comprises a lens configured to focus the light and an optical diffusing component configured to diffuse the light along the image axis. A relative distance between the linear array of light emitting diodes and the lens may be controllable for varying a focal distance of the linear image.

The lens may be a spherical lens. The lens may be a cylindrical lens. The optical diffusing component may be a lenticular lens. The lens may be a Fresnel lens. The Fresnel lens and the lenticular lens may be formed as a monolithic optical component. The Fresnel lens may be positioned adjacent to the lenticular lens. The housing may be configured such that the Fresnel lens is movable relative to the linear array of light emitting diodes, the method further comprising moving the Fresnel lens relative to the linear array to focus the linear image on the surface. The housing may be configured such that an orientation of the lenticular lens is variable relative to the linear array of light emitting diodes without altering a position of the Fresnel lens, the method further comprising varying the orientation of the lenticular lens to align the image axis. The housing may be configured such that the lenticular lens is removable, the method further comprising removing the lenticular lens and replacing the lenticular lens with a different lenticular lens having a different respective fan angle. The Fresnel lens may directly contact the lenticular lens.

In some example implementations of the method, at least one optical component comprises a diffractive optical element.

In some example implementations, the method further comprises independently controlling each light emitting diode of the linear array of light emitting diodes to animate a display of the linear image.

In some example implementations of the method, the linear array of light emitting diodes are powered to emit the light in response to a signal.

The signal may be generated by a sensor. The sensor may be a motion sensor. The motion sensor may be configured to detect motion within a spatial region defined relative to the location where the linear image is formed.

In some example implementations of the method, the linear array of light emitting diodes comprises at least two adjacent subarrays of light emitting diodes, each subarray including a first light emitting diode having a first colour and a second light emitting diode having a second colour, the method further comprising independently controlling the first light emitting diodes and the second light emitting diodes to control a colour of the linear image.

In some example implementations of the method, the linear array of light emitting diodes is a first linear array of light emitting diodes, the array axis is a first array axis, the linear image is a first linear image, the light is first light, and wherein the optical projection device further comprises:

a second linear array of light emitting diodes supported by the housing, the second linear array of light emitting diodes defining a second array axis that is parallel to the first array axis; and wherein the at least one optical component is further configured to focus second light emitted from the second linear array of light emitting diodes and generate a second linear image having a second image axis parallel to the second array axis, wherein the second linear image is generated such that second light from adjacent light emitting diodes of the second linear array of light emitting diodes is spatially overlapped and diffused along the second image axis and such that the second light is in focus along a direction perpendicular to the second image axis; and wherein the second linear image is formed on the surface, thereby virtually marking the surface with the linear image.

The first light emitted by the first linear array of light emitting diodes may have a different colour than the second light emitted by the second linear array of light emitting diodes. The method may further comprise controlling the first linear array of light emitting diodes and the second linear array of light emitting diodes such that only one of said first linear array of light emitting diodes and said second linear array of light emitting diodes is powered.

In some example implementations of the method, the linear image is a first linear image, the method further comprising forming employing a second optical projection device to generate a second linear image on the surface such that the second linear image intersects the first linear image at an angle.

In some example implementations of the method, the linear image is employed to demarcate a hazard zone.

In some example implementations of the method, the linear image is employed to demarcate a walkway.

In some example implementations of the method, the linear image is employed to demarcate a vehicle guide.

In some example implementations of the method, the linear image is employed to demarcate a reconfigurable workspace.

In some example implementations of the method, the surface is a floor. The floor may reside within an industrial facility. The floor may reside within a warehouse. The floor may reside within a manufacturing facility.

In another aspect, there is provided an optical projection device for forming a virtual optical marking a surface, the optical projection device comprising:

a housing;

a linear array of light emitting diodes supported by the housing, the linear array of light emitting diodes defining an array axis intersecting each light emitting diode; and at least one optical component supported by the housing, the at least one optical component being configured to focus light emitted from the linear array of light emitting diodes and generate a linear image having an image axis parallel to the array axis, the linear image being generated such that light from adjacent light emitting diodes is spatially overlapped and diffused in a length direction that is parallel to the image axis, and such that the light is in focus along a width direction that is perpendicular to the image axis;

wherein the at least one optical component is configured such that a distance between a distal end of the optical projection device and the linear image lies between 7.5 and 60 feet, such that the optical projection device is positionable relative to the surface to form the linear image on the surface and virtually mark the surface with the linear image.

In some example implementations of the device, the optical projection device is absent of an image mask device between the linear array of light emitting diodes and the at least one optical component.

In some example implementations of the device, at least one optical component is configured to collect and transmit the light from the linear array of light emitting diodes such that at least 25% of an optical power emitted by the linear array of light emitting diodes is transmitted to form the linear image.

In some example implementations of the device, at least one light emitting diode is a high-power light emitting diode configured to consume an electrical power of at least 5 W.

In some example implementations of the device, at least one optical component is configured such that a distance between a distal end of the optical projection device and the linear image is between 7.5 and 22.5 feet.

In some example implementations of the device, the linear array of light emitting diodes and the at least one optical component are configured such that an illuminance of the linear image is at least 4000 lux. The linear array of light emitting diodes and the at least one optical component may be configured such that an illuminance of the linear image is at least 10000 lux.

In some example implementations of the device, the at least one optical component is configured such that a length of the linear image exceeds a length of an output aperture of the at least one optical component by at least a factor of 10.

In some example implementations of the device, the at least one optical component comprises a lens configured to focus the light and an optical diffusing component configured to diffuse the light along the image axis. A relative distance between the linear array of light emitting diodes and the lens may be controllable for varying a focal distance of the linear image. The lens may be a spherical lens. The lens may be a cylindrical lens. The optical diffusing component may be a lenticular lens. The lens may be a Fresnel lens. The Fresnel lens and the lenticular lens may be formed as a monolithic optical component. The Fresnel lens may be positioned adjacent to the lenticular lens. The Fresnel lens may directly contact the lenticular lens.

The housing may be configured such that the Fresnel lens is movable relative to the linear array of light emitting diodes to vary a focal position of the linear image. The housing may comprise a first cylindrical body portion and a second cylindrical body portion, the second cylindrical body portion supporting the Fresnel lens, wherein the second cylindrical body portion is extendable relative to the first cylindrical body portion. The housing may be configured such that an orientation of the lenticular lens is variable relative to the linear array of light emitting diodes. The housing may comprise a first cylindrical body portion and a second cylindrical body portion, the second cylindrical body portion supporting the lenticular lens, wherein the second cylindrical body portion is movable relative to the first cylindrical body portion to permit variation of an orientation of the lenticular lens relative to the linear array of light emitting diodes. The housing may be configured such that the orientation of the lenticular lens is variable relative to the linear array of light emitting diodes without altering a position of the Fresnel lens. The housing may be configured such that the lenticular lens is removable.

In some example implementations of the device, the at least one optical component comprises a diffractive optical element.

In some example implementations, the device further comprises control circuitry operably coupled to the linear array of light emitting diodes, wherein the control circuitry is configured to control operation of the linear array of light emitting diodes. The control circuitry may be configured to independently control each light emitting diode of the linear array of light emitting diodes to animate a display of the linear image. The device may further comprise a sensor operably coupled to the control circuitry, wherein the control circuitry is configured to control operation of the linear array of light emitting diodes in response to a signal received from the sensor. The sensor may be a motion sensor.

The motion sensor may be configured to detect motion within a spatial region defined relative to a location of the linear image. The linear array of light emitting diodes may comprise at least two adjacent subarrays of light emitting diodes, each subarray including a first light emitting diode having a first colour and a second light emitting diode having a second colour, wherein the control circuitry is configured to independently control the first light emitting diodes and the second light emitting diodes to control a colour of the linear image.

In some example implementations of the device, the linear array of light emitting diodes is a first linear array of light emitting diodes, the array axis is a first array axis, the linear image is a first linear image, the light is first light, and wherein the optical projection device further comprises:

a second linear array of light emitting diodes supported by the housing, the second linear array of light emitting diodes defining a second array axis that is parallel to the first array axis; and wherein the at least one optical component is further configured to focus second light emitted from the second linear array of light emitting diodes and generate a second linear image having a second image axis parallel to the second array axis, the second linear image being generated such that second light from adjacent light emitting diodes of the second linear array of light emitting diodes is spatially overlapped and diffused along the second image axis and such that the second light is in focus along a direction perpendicular to the second image axis; and wherein the second linear array of light emitting diodes are operably coupled to the control circuitry.

The control circuitry may be configured such that the first light emitted by the first linear array of light emitting diodes has a different colour than the second light emitted by the second linear array of light emitting diodes. The control circuitry may be configured to control operation of the first linear array of light emitting diodes and the second linear array of light emitting diodes such that the first linear array of light emitting diodes can be independently controlled relative to the second linear array of light emitting diodes.

A further understanding of the functional and advantageous aspects of the disclosure can be realized by reference to the following detailed description and drawings.

BRIEF DESCRIPTION OF THE DRAWINGS

Embodiments will now be described, by way of example only, with reference to the drawings, in which.

DETAILED DESCRIPTION

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms "comprises" and "comprising" are to be construed as being inclusive and open ended, and not exclusive. Specifically, when used in the specification and claims, the terms "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions. Unless otherwise specified, the terms "about" and "approximately" mean plus or minus 25 percent or less.

It is to be understood that unless otherwise specified, any specified range or group is as a shorthand way of referring to each and every member of a range or group individually, as well as each and every possible sub-range or sub-group encompassed therein and similarly with respect to any sub-ranges or sub-groups therein. Unless otherwise specified, the present disclosure relates to and explicitly incorporates each and every specific member and combination of sub-ranges or sub-groups.

As used herein, the term "on the order of", when used in conjunction with a quantity or parameter, refers to a range spanning approximately one tenth to ten times the stated quantity or parameter.

The present inventors, in seeking to address the aforementioned shortcomings of conventional optical projection devices, realized that clear and bright lines could be projected by employing an array of light emitting diodes (LEDs) and projecting the light from the LED array such that the light is focused and diffused to produce an image that is stretched into a line, thereby generating a linear image with light from adjacent LEDs being spatially overlapped in a direction parallel to the axis of the LED array. Such an approach has been found by the inventors to provide a number of advantages over conventional laser and shadow mask projection approaches, as described in further detail below.

Figure 1:
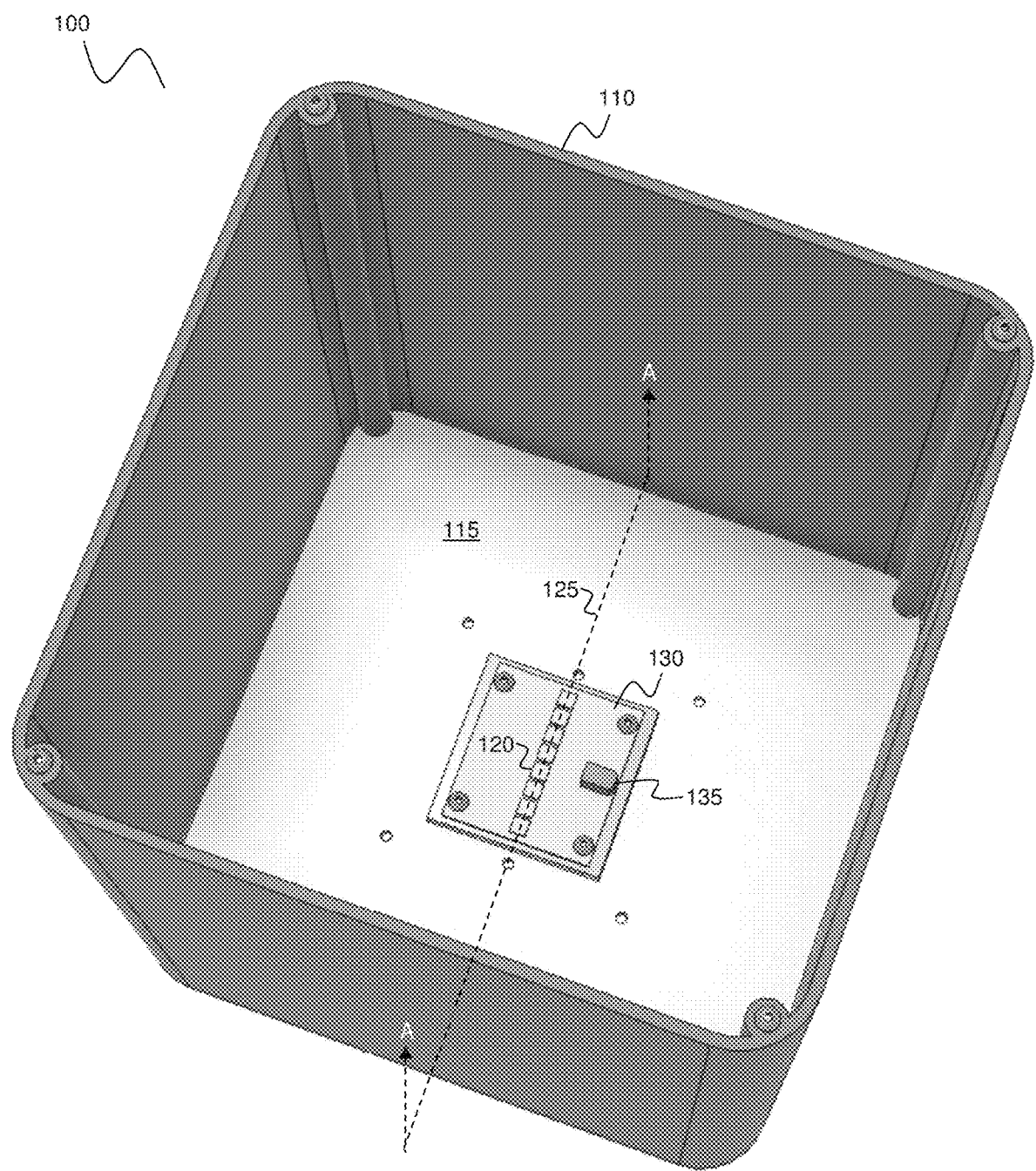
FIG. 1 shows an example optical projection device for projecting a linear image with the focusing and diffusing element removed.
Figure 2:
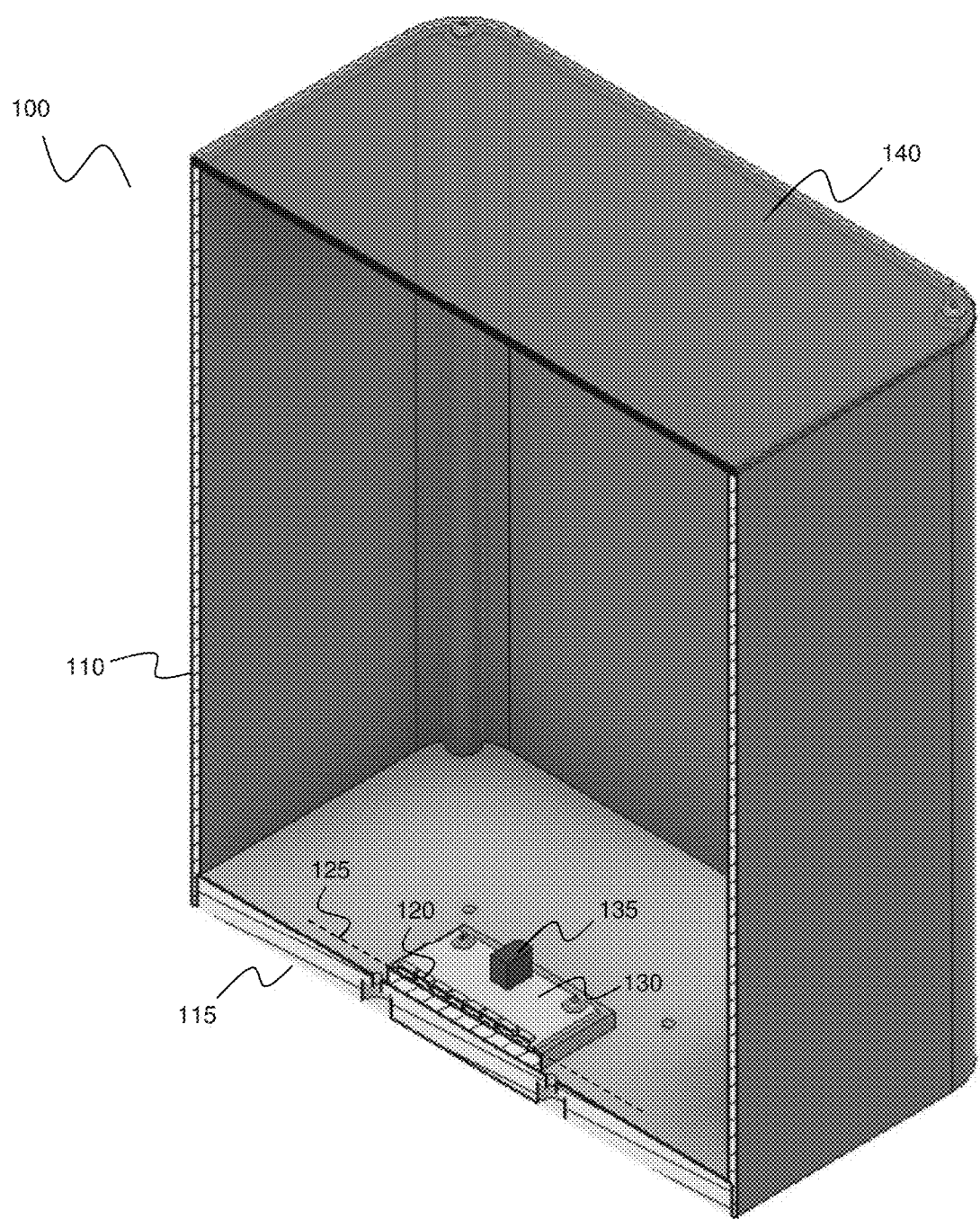
FIG. 2 shows a sectioned view of the optical projection device beyond the plane shown at A-A in FIG. 1, with the focusing and diffusing element included.

Referring now to FIGS. 1 and 2, an example optical projection device 100 for generating a linear image is shown. The example optical projection device 100 includes a housing formed by the lateral frame 110 and a proximal support plate 115. The proximal support plate 115 supports an array of LEDs 120 thereon, where the LEDs 120 are arranged in a linear array along a linear array axis 125. The linear array of LEDs 120 is shown mounted on a printed circuit board 130 that includes a connector for delivering power to the LED array 120.

FIG. 2 is a sectioned view beyond the plane A-A shown in FIG. 1. FIG. 2 also shows a focusing and diffusing optical element, shown at 140, which is employed to focus the light emitted by the LEDs 120 while also diffusing the light along an image axis parallel to the array axis 125, thereby generating a linear image. Various examples of suitable optical components for providing the focusing and diffusing element 140 are provided below. The focusing and diffusing optical element 140 is not shown in FIG. 1 in order to permit the viewing of the LEDs 120 and associated components.

Figure 3A:
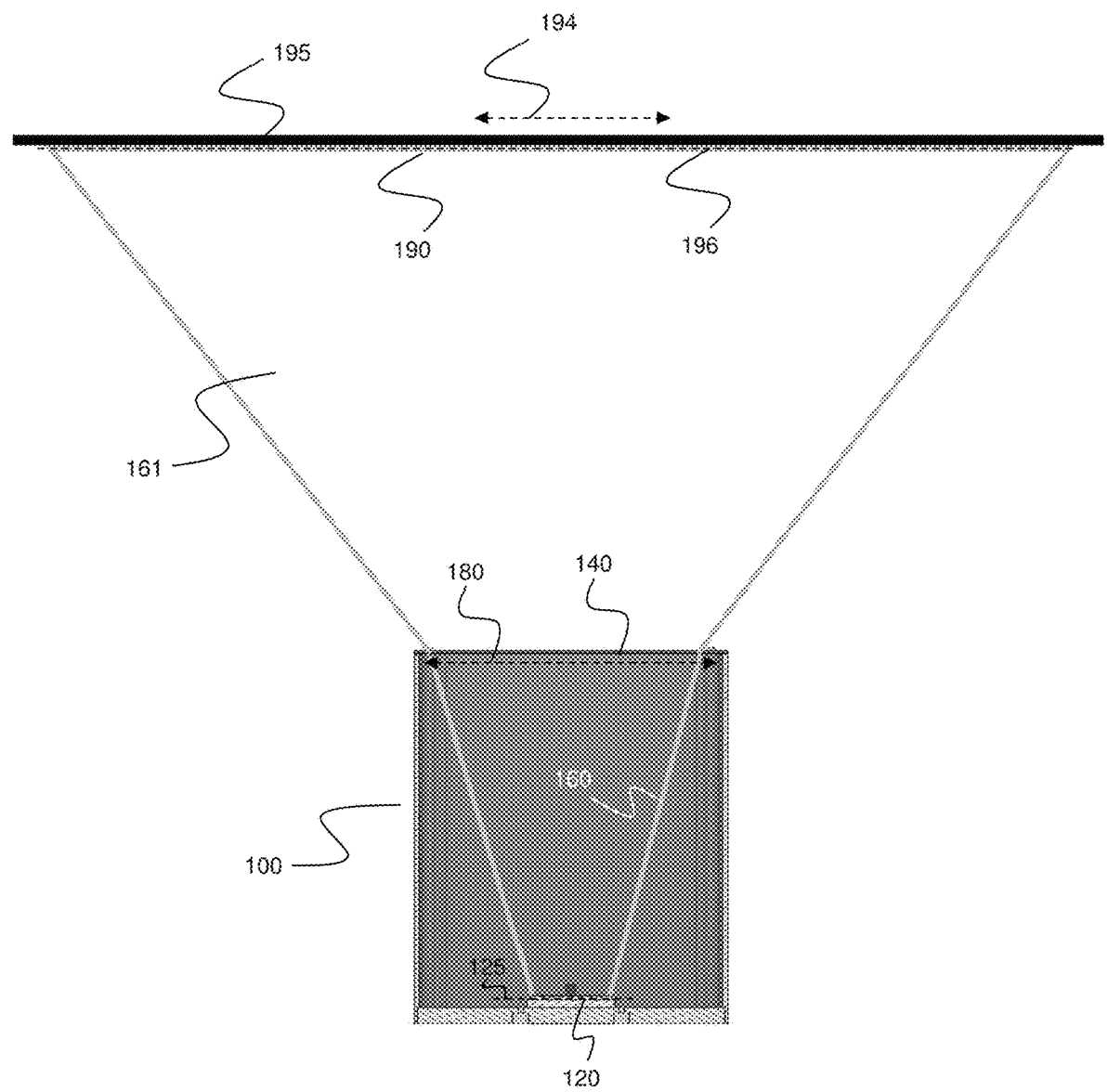
FIGS. 3A and 3B show ray diagrams (A) within the plane including the array axis of the LED array and (B) perpendicular to the plane that includes the array axis.
Figure 3B:
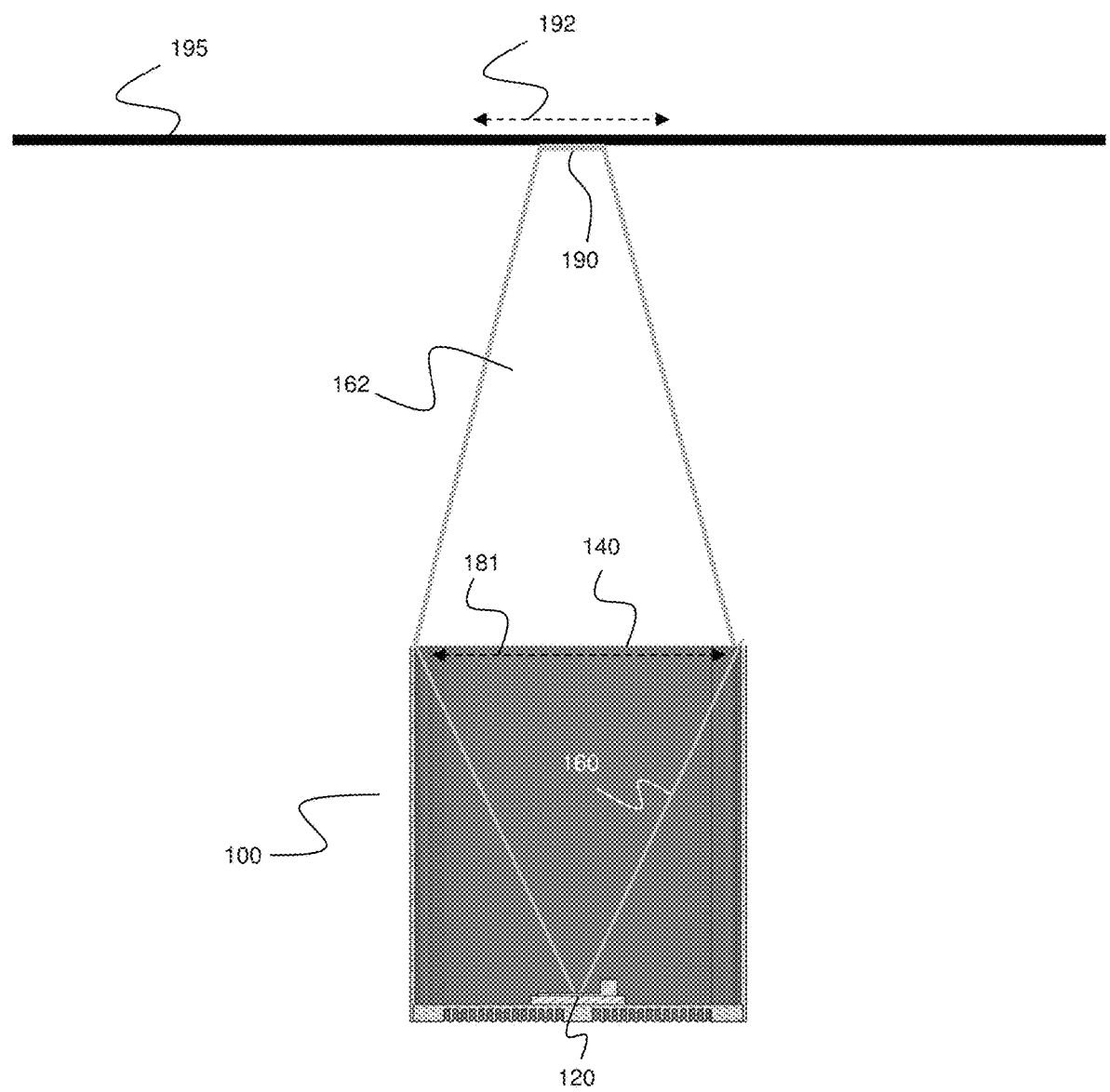

FIGS. 3A and 3B illustrate the role of the focusing and diffusing optical element 140 in generating a linear image 190. Both figures show the example optical projection device 100 with a linear array of LEDs 120 supported by the housing. FIG. 3A shows a cross-sectional view taken along the plane A-A shown in FIG. 1, such that all LEDs 120 of the array are visible and the array axis 125 lies within the plane of the figure. FIG. 3B shows an orthogonal cross-section, such that the array axis is perpendicular to the cross-sectional view and only the central LED 120 is shown. Both figures show the cone of light 160 emitted by the LEDs at 160, with the focusing and diffusing optical element 140 shown collecting the majority of the emitted light. While the examples show the input aperture of the focusing and diffusing element 140 collecting all of the light emitted by the LED, in some example embodiments, only a fraction of the emitted light is collected. In some example embodiments, the amount of optical power collected from LEDs is at least 25%. In some example embodiments, the amount of optical power collected from LEDs is at least 50%. The amount of emitted light that is collected by the input aperture of the focusing and diffusing element 140 may be increased, for example, by employing LEDs with integrated lenses that produce a narrow beam profile.

As can be seen in FIG. 3B, the focusing and diffusing optical element 140 focuses the emitted light to generate a focused image 190 in the width direction 192. However, as shown in FIG. 3A, instead of generating an image of each individual LED 120, the focusing and diffusing optical element 140 diffuses the emitted light in the length direction 194, such that light from adjacent LEDs (i.e. from at least two sequential LEDs in the array) is spatially overlapped and diffused, resulting in the formation of a linear image 190 on the surface 195. The linear image 190 is formed having an image axis 196 that is parallel to the array axis 125, as shown in FIG. 3A.

Figure 3C:
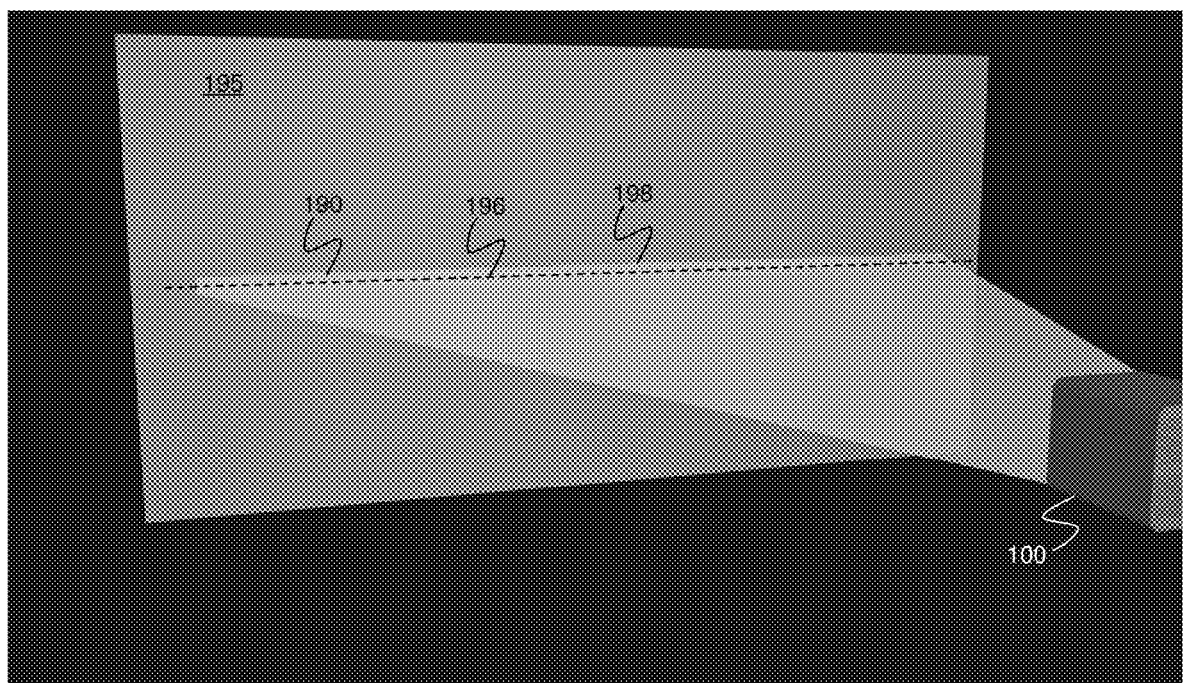
FIG. 3C shows an example of a linear image formed via the optical projection device.

FIG. 3C shows an example of the generation of a linear image 190 on a surface 195 via an example optical projection device 100. Due to the diffusion of the light in the length direction (the direction parallel to the array axis of the LEDs within the optical projection device 100), and the focusing of the light in the orthogonal width direction, a linear image 190 is formed. The linear image 190 has an associated image axis 196 in the length direction and a clearly defined upper and lower boundaries in the width direction (the upper linear image boundary 198 is shown in the figure). The surface 195 is therefore virtually marked with a linear image 190 generated in the shape of an elongate rectangular stripe having clearly defined elongate edges.

The focusing and diffusing optical element 140 may be a single optical component that is configured to perform the dual role of focusing and linear diffusion. Alternatively, two or more distinct optical components may be provided that achieve this function.

In one example embodiment, the focusing of the light is achieved via a lens and the linear diffusion of the light may be achieved via an optical diffusing component. The lens may be configured to focus the light in two dimensions (with the light in one of the dimensions being diffused by the diffusing optical element). For example, the lens may be a spherical or aspheric lens. In some example embodiments, the lens may be a spherical Fresnel lens or an aspheric Fresnel lens. Alternatively, the lens may be configured to focus the light one dimension (the dimension perpendicular to the array axis of the LED array). For example, a cylindrical lens (e.g. a cylindrical Fresnel lens) may be employed such that a cylindrical axis of the cylindrical lens is parallel to the array axis of the LEDs, such that focusing is only provided in the width direction that is orthogonal to the array axis. Since the light is not focused in the length direction, a separate optical diffusing element may not be necessary. However, an optical diffusing element may be provided in addition to the cylindrical lens, for example, to achieve improved diffusion of the light and/or to extend the length of the linear image.

One non-limiting example of an optical diffusing component is a lenticular lens. A lenticular lens includes an array of elongate focusing elements (e.g. an array of cylindrical lenses), with each of the elongate focusing elements having parallel axes, such that light passing thought the lenticular lens is diffused in a direction that is perpendicular to the axes. Accordingly, a lenticular lens may be provided such that the axes of the lenticular lens are perpendicular to the array axis, thus diffusing the light in a direction that is parallel to the array axis, as shown in FIG. 3A. It will be understood that a lenticular lens is but one example of a suitable diffusing optical element and that other diffusing optical elements may be employed in the alternative. For example, a linear Fresnel lens, a diffractive optical element, or one or more other line-generating optical elements may be employed to diffuse the light.

In example embodiments involving a separate lens and diffusing optical component, the diffusing optical component may be placed distalward relative to the lens, such that the diffusing optical component is further from the LED array than the lens. Alternatively, the lens may be placed distalward relative to the diffusing optical element, such that the diffusing optical element is closer to the LED array than the lens.

As noted above, in some example embodiments, the focusing and diffusing optical element may be provided by a single optical component. One example of such a single optical component is a refractive optical component having a first surface that is configured for focusing the light from the LED array and a second surface that is configured to diffuse the light in a direction parallel to the array axis. For example, the first surface may be a conventional refractive lens (e.g. a spherical, aspheric or cylindrical lens) or a Fresnel lens (e.g. a spherical Fresnel lens or a linear Fresnel lens), and the second surface may include an array of lenticules or be shaped in the form of a linear Fresnel lens for diffusing the light. It will be understood that the surface that is configured for focusing the light may be facing the LED array or the surface configured for diffusing the light may be facing the LED array.

In one example embodiments, the focusing and diffusing optical element may include a diffractive optical element that is configured for one or more of (i) focusing of the light in the direction perpendicular to the array axis of the LED array and (ii) diffusing the light in the direction parallel to the array axis of the LED array.

Referring again to FIGS. 2, 3A and 3B, in one example implementation, the focusing and diffusing element 140 may be provided as a Fresnel lens and a lenticular lens. The present inventors have found that this combination of optical components may be beneficial in forming a suitable focusing and diffusing element for virtual marking a floor with a linear image. In particular, such a configuration may be economical and practical due to availability of off the shelf parts and the flexibility in configuring the unit to project at various diffusion angles by changing the lenticular lens. In one example implementation, the lenticular lens is located distalward from the Fresnel focusing lens, and the lenticular lens is located adjacent to, or attached to, the Fresnel focusing lens.

It will be understood that FIGS. 3A and 3B are intended to be illustrative and are not intended to be drawn to scale. For example, while the length of the linear image 190 shown in FIG. 3A is shown as being approximately 5 times the length of the output aperture 180 of the optical projection device, the length of the linear image may exceed the length of the output aperture by a larger ratio, for example, a ratio exceeding 10 (as shown, for example, in FIG. 3C). Furthermore, while the width of the image 190 shown in FIG. 3B may be greater than or less than the width of the output aperture 180 of the optical projection device. For example, the present inventors have produced optical projection devices that generate linear images with lengths exceeding 30 feet and with widths exceeding 4 inches.

Figure 4:
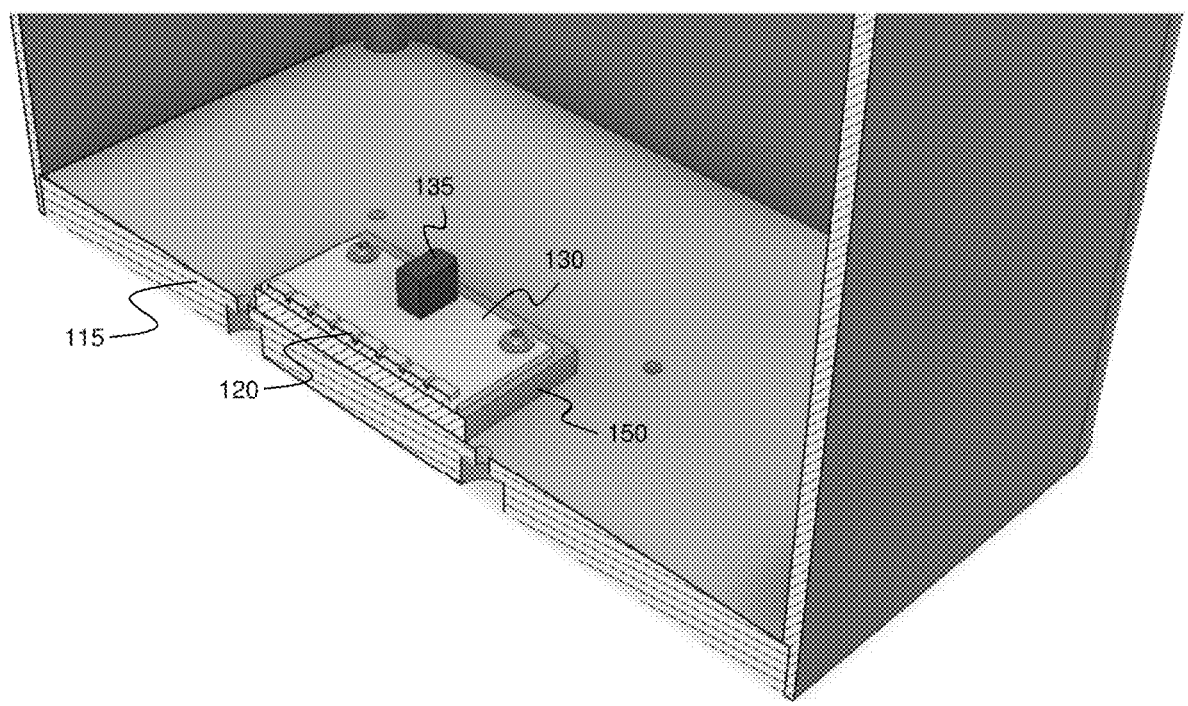
FIG. 4 shows a detailed view that illustrates an example configuration for mounting the LED array with the optical projection device.
Figure 5:
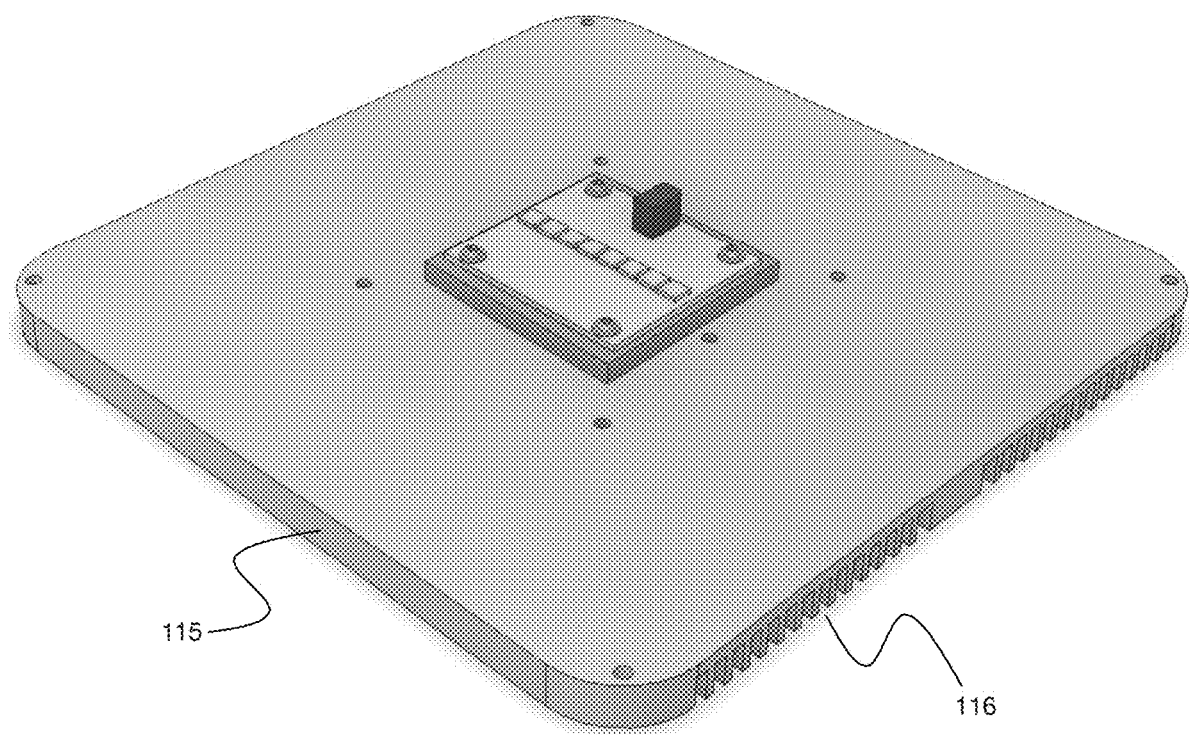
FIGS. 5 and 6 show an example of a metallic plate for supporting the LED array and for providing heat dissipation.
Figure 6:
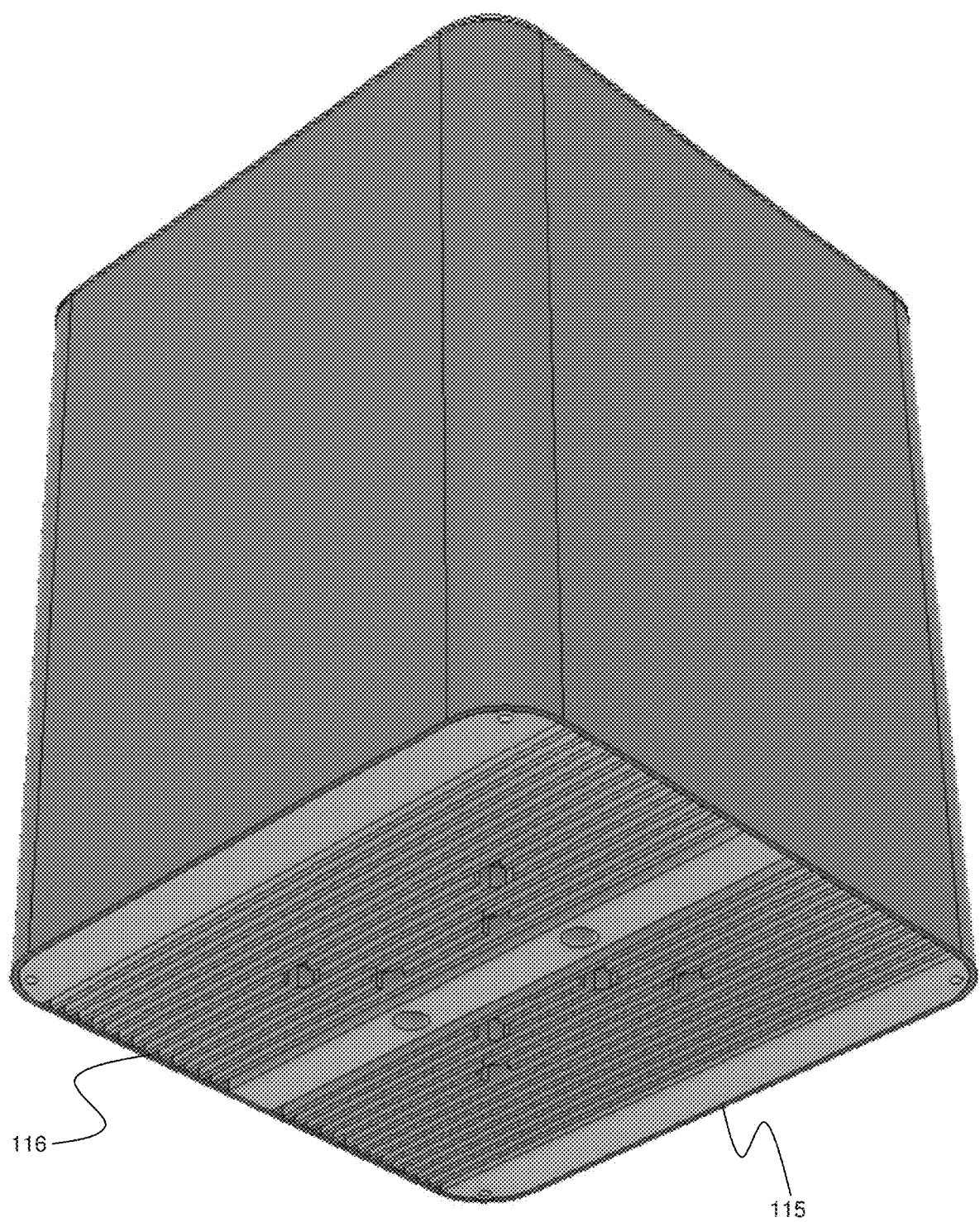

Referring now to FIG. 4, an example implementation is shown in which the LED array 120 is supported by a circuit board 130 which also supports connector 135. As shown in the figure, the circuit board 130 may be supported by a metallic platform 150 that resides on the metallic proximal support plate 115. The metallic platform 150 conducts heat generated within the LED array 120 to the metallic proximal support plate 115, which in turn acts as a heat sink. For example, as shown in FIGS. 5 and 6, the metallic support plate 115 may include one or more finned features 116 to facilitate the removal of heat.

The metallic platform 150 may have a height that is configured to achieve a desired focal distance of the linear image. For example, small variations in the height of the metallic platform 150 may result in larger variations in the focal distance of the linear image. In some example embodiments, several different metallic platforms may be available, each with a different thickness that results in a respective different focusing distance of the optical projection device, such that a metallic platform may be selected that results in a focusing distance that best suits a particular application (e.g. a particular height relative to a floor). In other example implementations, the separation between the LED array and the focusing and diffusing optical element may be reconfigurable via another means. For example, the offset of the focusing and diffusing element may be varied by the insertion of a spacer having a suitable thickness to achieve a desired focusing distance. In another example, the focusing and diffusing element may be positionable among a plurality of discrete or continuous locations, for example, via threaded attachment to the housing, or, for example, via a linear slot in the housing and an associated screw that can be employed to lock the focusing and diffusing optical element at a position that achieves a desired focusing distance).

It will be understood that the brightness, colour, length, and thickness of the linear image can be defined and/or varied by using different types of LEDs, different numbers of LEDs, and different types of lenses and diffusing optical elements. For example, the length of the linear image is determined, in part, based on factors including the length of the LED array and the properties of the focusing and diffusing optical element. For example, a longer LED array (with more LEDs) will produce a longer linear image. The length of the linear image is also determined based on the angular spread of the light, in the direction parallel to the array axis of the LED array, that is produced by the diffusing optical component (or diffusing surface of a monolithic optical component that provides both focusing and diffusive beam spreading). For example, the present inventors have employed lenticular lenses with beam spread angles ranging from 30° to 75° to obtain different lengths of projected linear images. It is also noted that a longer linear image can be achieved by employing a cylindrical lens as opposed to a spherical lens.

The optical projection devices described in the present disclosure may be employed for a wide range of uses. In some example implementations, the optical projection devices may be employed for virtually marking a surface. The surface may be a wall, floor, road, pathway, or other surface. In some example implementations, the surface is a surface within an industrial environment, such as a floor of a manufacturing facility or a warehouse. For example, the linear image may be employed to virtually mark a floor in a region associated with a hazard. For example, the linear image may be employed to virtually mark a floor in a region associated with a safe zone, such as a walkway or crosswalk. The linear image may also be employed to virtually mark a floor to mark a guide path for a vehicle. In another example implementation, the linear image may be employed to virtually mark a surface associated with a workspace.

Figure 7:
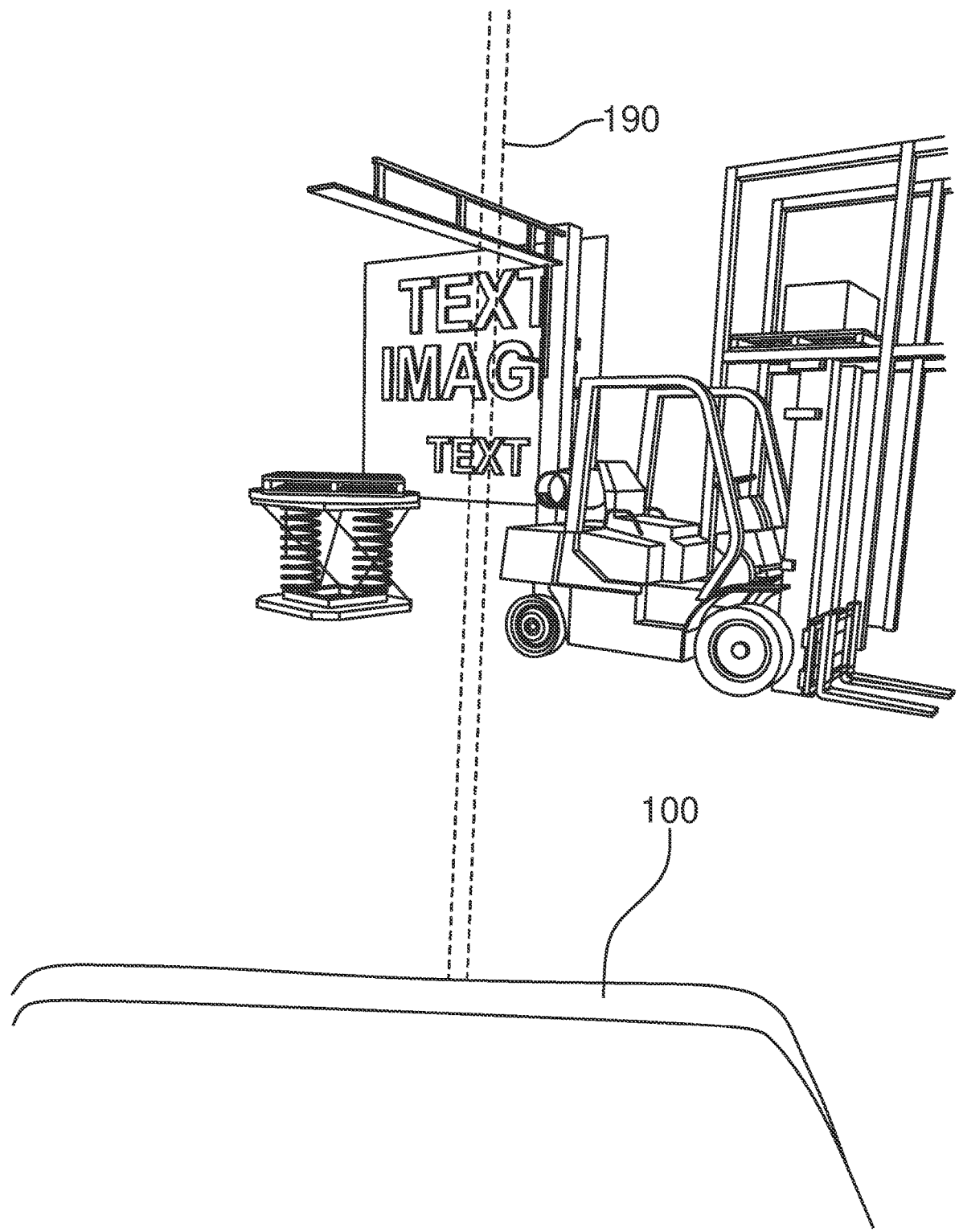
FIG. 7 is a photograph showing an example optical projection device and a linear image projected onto a wall within an industrial environment.

An example of such an industrial virtual marking embodiment is demonstrate in the photograph shown in FIG. 7, which shows a bright linear image 190 projected by an optical projection device 100 at a distance of 20 feet on a distant wall in a manufacturing facility. As can be seen in the photograph, a bright elongate rectangular image is generated with clear elongate edges and a high aspect ratio, with a width of 4 inches and a length of 30 feet.

In some implementations, the focusing distance, i.e. the distance between the output aperture (the distal end) of the optical projection device (e.g. the distalmost surface of the focusing and diffusing optical element) and the linear image, may exceed 7.5 feet, thereby facilitating a large separation between the optical projection device and the surface to be marked. For example, such a focusing distance permits the optical projection device to be supported over a floor on a ceiling. In some example implementations, the focusing distance may lie between 7.5 and 60 feet, permitting the use of the optical projection device in settings with high ceilings. In some example implementations, the focusing distance may lie between 7.5 and 22.5 feet and the LEDs may be high power LEDs that generate a linear image having an illuminance exceeding 4000 lux. In some example implementations, the focusing distance may lie between 7.5 and 22.5 feet and the LEDs may be high-power LEDs that generate a linear image having an illuminance exceeding 10,000 lux. In some example implementations, the focusing distance may lie between 7.5 and 22.5 feet and the LEDs may be high power LEDs that generate a linear image having an illuminance between 4000 lux and 10,000 lux. For example, the high-power LEDs may have a rated electrical power exceeding 5 W per LED (i.e. they may dissipate more than 5 W during operation).

In one example embodiment, the control and processing circuitry is operably coupled to the LED drive circuitry and may be employed to selectively operate one or more of the LEDs of the LED array, thereby animating the display of the linear image. For example, by sequentially turning on each LED in the LED array, the length and brightness of the LED array can be dynamically increased. For example, a linear image can be made to flash or strobe to bring additional attention to an area (e.g. a hazard zone).

In another example embodiment, the LEDs of the LED array may be arranged in the form of at least two adjacent subarrays of LEDs, with each subarray of LEDs including at least two LEDs having different colours (e.g. a first LED having a first colour and a second LED having a second colour). Control circuitry operably coupled to the LED driving circuitry may be employed to independently control the different coloured LEDs in order to change the colour of the displayed linear image. For example, if each sub-array includes a red, blue and green LED, a first electrical drive current may be provided to all of the red LEDs, a second drive current may be provided to all of the green LEDs and a third drive current may be provided to all of the blue LEDs, and the colour of the linear image formed from the LED array (including two or more R-G-B LED subarrays) may be controlled by varying the first, second and third electrical drive currents. This colour-changing example embodiment may be employed, for example, to control the colour of the projected line to change based on a colour-coding procedure associated with a given organization or regulation.

While the preceding example embodiments refer to the projection of a single linear image from a single optical projection device, it will be understood that two or more optical projection devices may be employed to generate more complex virtual markings, such as a virtual marking involving two intersecting linear images (e.g. perpendicular intersecting linear images).

Moreover, while the preceding example embodiments described an optical configuration involving a single row of LEDs, it will be understood that more complex configurations can be realized by including one or more additional rows. For example, an optical projection device may be provided with multiple linear LED arrays, each having respective array axes that are parallel. The focusing and diffusing optical element (such as, but not limited to, the combination of a spherical Fresnel lens and a lenticular lens) produces a linear image having multiple elongate image lines, each image line being associated with a different LED array. In one example implementation, control and processing circuitry operably coupled to the LED drive circuitry may be employed to selectively operate one or more of the LED arrays. For example, if the LED arrays each have a different colour, the colour of the resulting linear image may be changed by selectively operating a single LED array having the desired colour.

While the preceding example embodiments employ a diffusing element to spatially overlap light from adjacent LEDs to form a linear image that is homogeneous in the length direction, in an alternative example embodiment, a focusing element for focusing the light from the LEDs in two dimensions (parallel and perpendicular to the array axis of the LEDs) can be employed in the absence of a diffusing element, thereby permitting the formation of a segmented linear image in which distinct features associated with the individual LEDs is formed (a "line of spots"). Such an example embodiment may be beneficial in providing an illuminance that is sufficiently high to permit visibility on brightly lit (e.g. sunlit surfaces.

The present example embodiments employing the projection of light from LED arrays have been found to address many of the aforementioned shortcomings of conventional laser and shadow lens projection approaches. Lasers also have a more limited operating life than LEDs. For example, due to the combined output power of the LEDs, the projected linear image is much brighter than that which could be achieved using an eye-safe laser when an eye-safe laser is projected at an equivalent line thickness (for example, the present inventors found that a conventional eye-safe laser projection system was only capable of generating an illuminance of 900 lux when projected with a line width equal to that of an optical projection device with an illuminance of 4000 lux that was provided according to the present example embodiments). A further advantage of the present example embodiments relative to laser-based projection systems is the longer lifetime of LEDs relative to lasers.

The present example optical projection systems also address some of the shortcomings of conventional shadow lens-based projection systems. For example, the absence of a mask in selected embodiments, unlike shadow lens-based projectors, enables much higher optical efficiency and image brightness. Indeed, a focusing and diffusing optical element that is employed according to the present example embodiments allows the use of the full aperture to focus, shape and project the collected light to form the image. As a result, an 80 W optical projection device according to the present example embodiments has been found to produce a much brighter and longer line than a 300 W shadow lens (Gobo) projector.

In some example embodiments, a sensor may be employed to selectively control the optical projection device. For example, the optical projection device may include, or be operatively coupled to, control circuitry that controls the LEDs, and the control circuitry may be operably coupled (e.g. wired or wirelessly coupled) to a sensor. The sensor may be, for example, a motion sensor (such as a passive infrared (PIR) sensor) or, for example a beam break sensor. The sensor may be employed to sense motion within a prescribed spatial region relative to the location where the linear image is projected (e.g. a region surrounding and including a hazard region). The control circuitry may be programmed, for example, to selectively operate the optical projection device to generate the virtual marking when the sensor senses movement within the prescribed spatial region.

Figure 8:
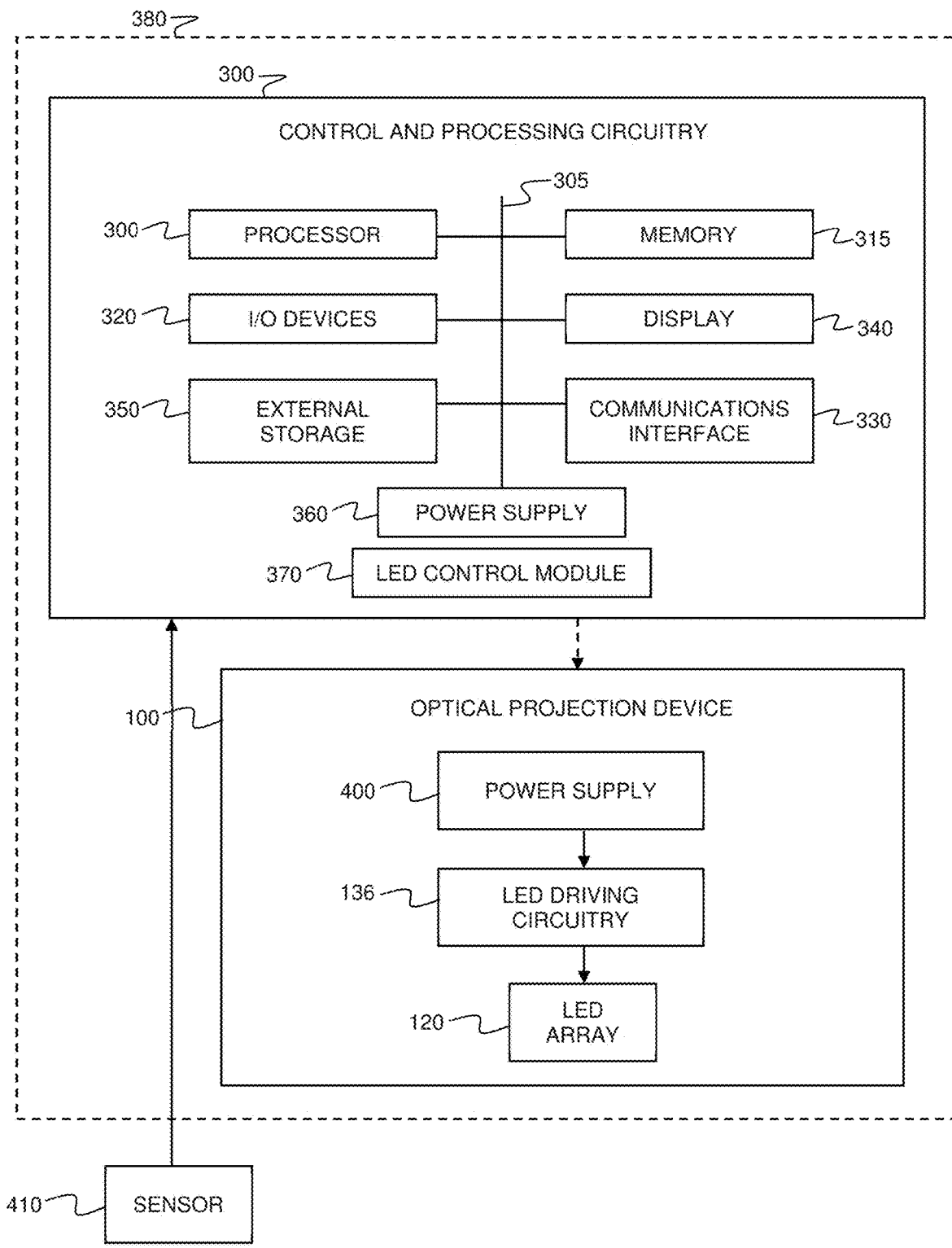
FIG. 8 is a block diagram of an example optical projection system that optionally includes a sensor.
Figure 9:
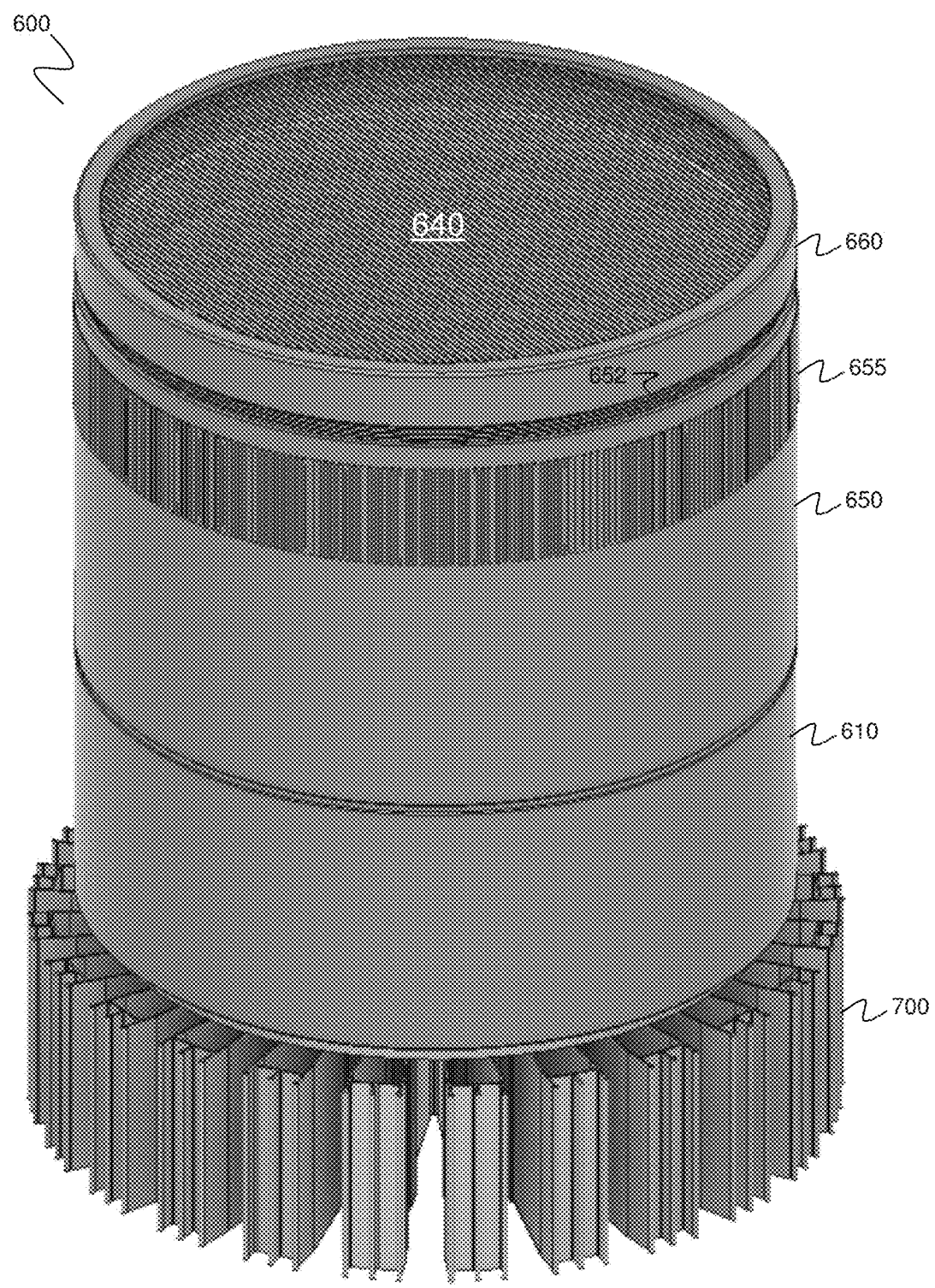
FIGS. 9-11 illustrate an example implementation of an optical projection device formed from multiple cylindrical housings.
Figure 10:
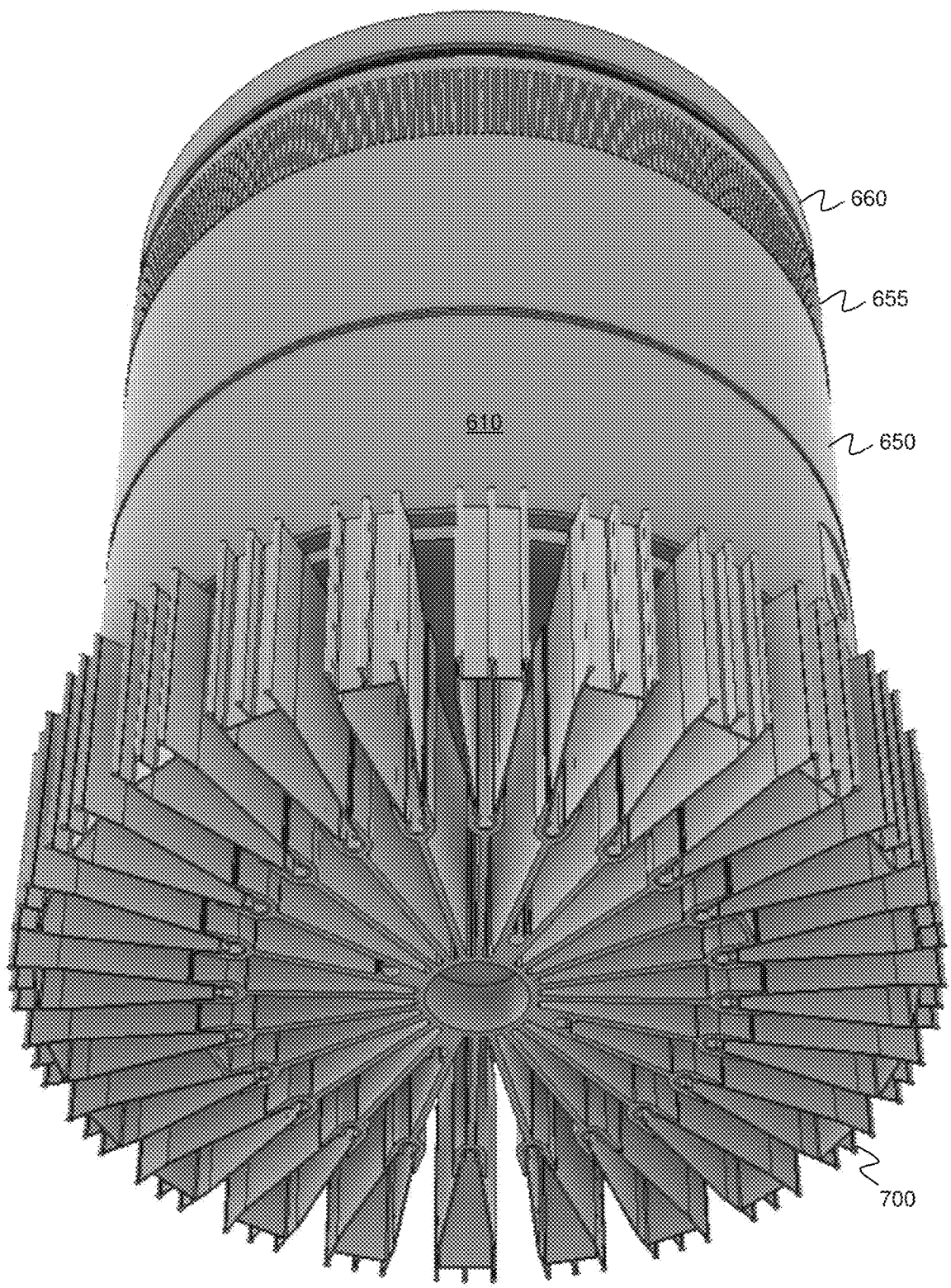
Figure 11:
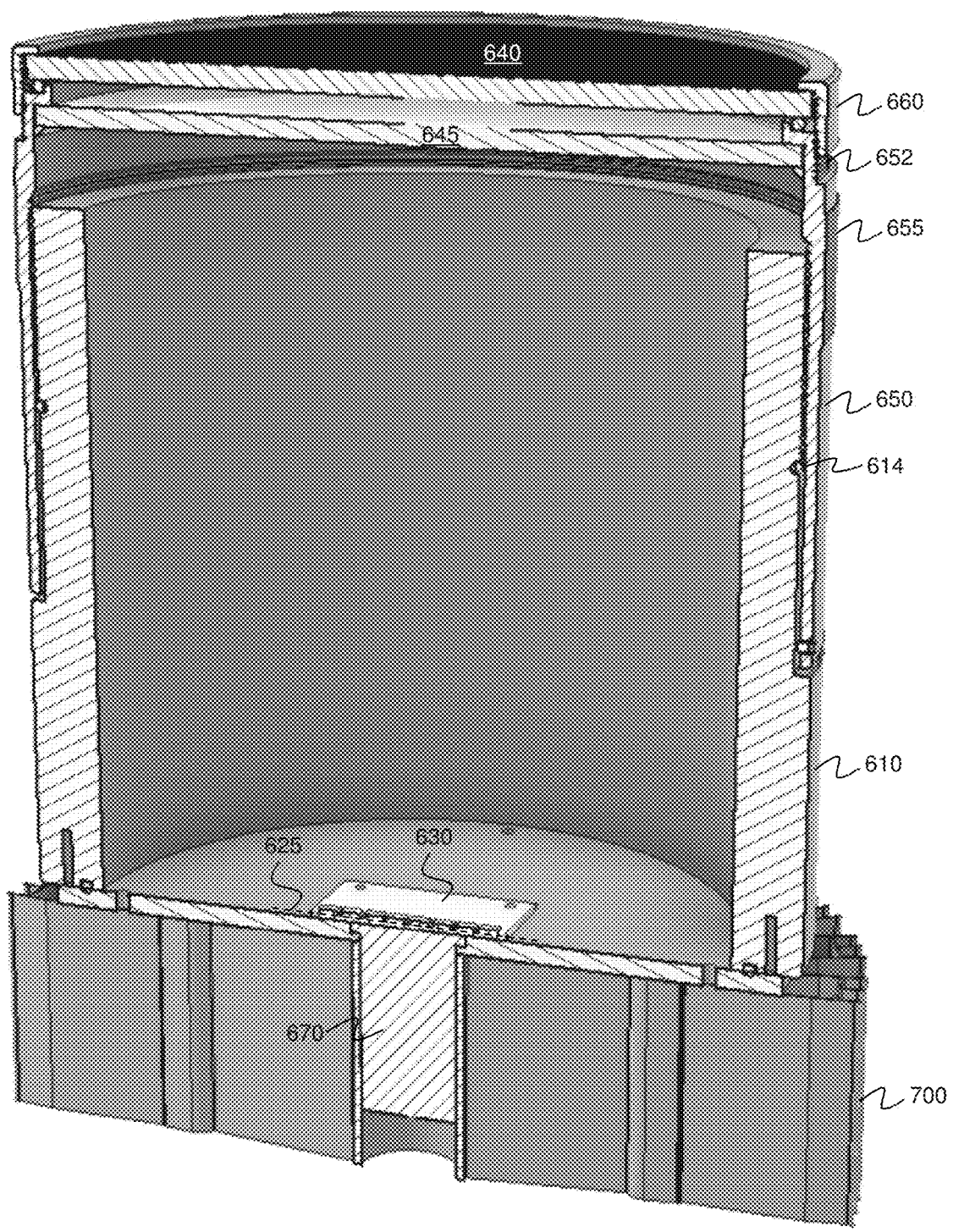
Figure 12:
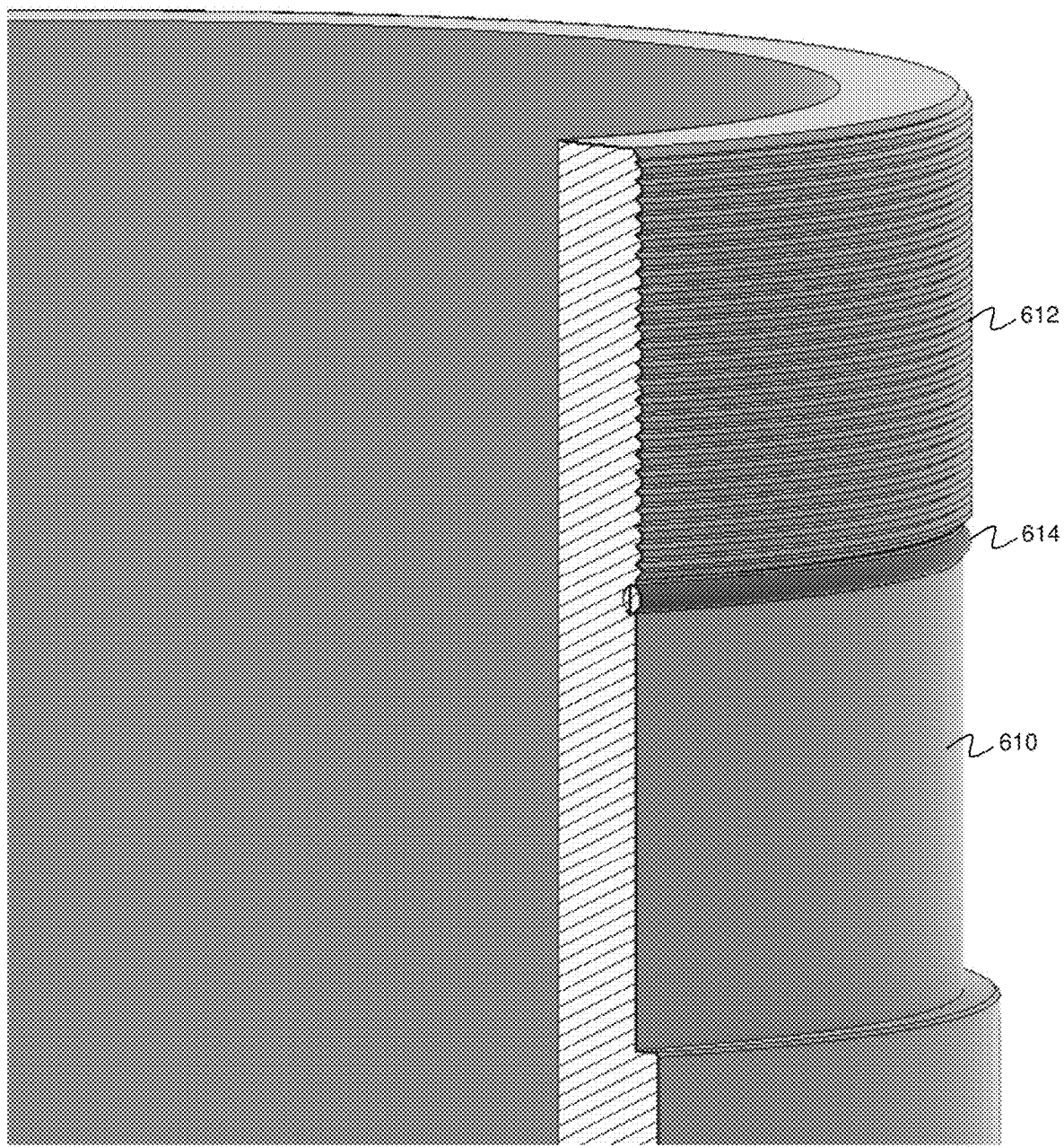
FIG. 12 provides a detailed view of the first cylindrical body portion, showing an external threaded region and an O-ring.
Figure 13:
FIG. 13 provides a bottom view of an example implementation of an optical projection device with the heat sink removed.

Referring now to FIG. 8, an example system is shown that includes an optical projection device 100 that is operatively coupled to a control and processing circuitry 300. The optical projection device 100 may be based, for example, on the example embodiments shown in FIGS. 1-5, or variations thereof. As can be seen in the figure, the optical projection device 100 may include a power supply 400, optional LED driving circuity 136 (alternatively the power supply may be directly connected to the LED array, with control the control and processing circuitry controlling the delivery of current from the power supply to the LED array) and the LED array 120. Furthermore, as described above, a sensor 410 may be connected to the control and processing circuity 300 (e.g. directly or wirelessly).

As shown in the example embodiment illustrated in FIG. 8, the control and processing circuity 300 may include a processor 310, a memory 315, a system bus 305, one or more input/output devices 320, and a plurality of optional additional devices such as communications interface 330, display 340, external storage 350, and power supply 360.

The present example methods for controlling the operation of the LED array and resulting linear image generation can be implemented via processor 310 and/or memory 315. As shown in FIG. 8, the processing of signals received by a sensor 410 is performed by control and processing circuity 300, via executable instructions represented as LED control module 370.

The methods described herein can be partially implemented via hardware logic in processor 310 and partially using the instructions stored in memory 315. Some embodiments may be implemented using processor 310 without additional instructions stored in memory 315. Some embodiments are implemented using the instructions stored in memory 315 for execution by one or more microprocessors. Thus, the disclosure is not limited to a specific configuration of hardware and/or software.

It is to be understood that the example system shown in the figure is not intended to be limited to the components that may be employed in a given implementation. For example, the system may include one or more additional processors. Furthermore, one or more components of control and processing circuity 300 may be provided as an external component that is interfaced to a processing device. For example, one or more components of the control and processing circuity 300 may be provided within optical projection device 100, as shown at 380. In another example implementation, the control and processing circuitry 300 may be wirelessly connected to the optical projection device 100, for example, through a wireless communication modality such as Wifi or Bluetooth®.

While some embodiments can be implemented in fully functioning computers and computer systems, various embodiments are capable of being distributed as a computing product in a variety of forms and are capable of being applied regardless of the particular type of machine or computer readable media used to actually effect the distribution.

At least some aspects disclosed herein can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

A computer readable storage medium can be used to store software and data which when executed by a data processing system causes the system to perform various methods. The executable software and data may be stored in various places including for example ROM, volatile RAM, nonvolatile memory and/or cache. Portions of this software and/or data may be stored in any one of these storage devices. As used herein, the phrases "computer readable material" and "computer readable storage medium" refers to all computer-readable media, except for a transitory propagating signal per se.

The following examples are presented to enable those skilled in the art to understand and to practice embodiments of the present disclosure. They should not be considered as a limitation on the scope of the disclosure, but merely as being illustrative and representative thereof.

EXAMPLES

FIGS. 9-17 illustrate an alternative example implementation of an example optical projection device 600 for generating a linear image is shown. The example optical projection device 600 includes a housing formed by the first cylindrical body portion 610, a second cylindrical body portion 650, an a third cylindrical body portion 660, a proximal support plate 615, and a heat sink 700.

The proximal support plate 615 supports an array of LEDs 620 thereon, where the LEDs 620 are arranged in a linear array along a linear LED array axis 625. The linear array of LEDs 620 is shown mounted on a printed circuit board 630 that includes a connector for delivering power to the LED array 120. The LEDs 620 and circuit board 630 are in thermal communication with a heat pipe (heat column) 670 that is in thermal contact with the heat sink 700.

In the example embodiment illustrated in the figures, the first cylindrical body 610 extends from the proximal support plate 615 and the second cylindrical body portion supports a Fresnel lens 645 and is positionable (extendable), in a direction parallel to the cylinder axis, relative to the first cylindrical body 610 such that a distance between the Fresnel lens 645 and the proximal support plate 615 is variable. Such a configuration permits control over the location of the focus of the LED image. For example, as shown in the figures, the second cylindrical body 650 may be secured to the first cylindrical body by mating threads (e.g. a thread 612 provided on the first cylindrical body 610 and a corresponding thread 656 provided on the second cylindrical body 656, such that threading the second cylindrical body onto the first cylindrical body varies the axial offset (along a direction of the axis of the cylindrical bodies) of the Fresnel lens 645 relative to the proximal support plate 615. It will be understood that other configurations may alternatively be employed that permit the variation in the axial offset of the Fresnel lens 645 relative to the proximal support plate 615, such as configurations that permit slidable extension of the second cylindrical body 650 relative to the first cylindrical body portion 610 and the detachable securing of the second cylindrical body portion 650 relative to the first cylindrical body portion 610 (e.g. via a clamp or set screw).

As shown in the figures (in particular, FIGS. 14, 15A, 15B and 16), the third cylindrical portion 660 supports a lenticular lens 640 and is removably secured to the second cylindrical body 650 such that the orientation of the lenticular lens 640 can be rotationally aligned with the linear LED array axis 625. As shown in the example implementation shown in the figures, in which the third cylindrical body 660 is threaded onto the second cylindrical body 650 to clamp and secure the lenticular lens 645, unscrewing of the third cylindrical body 660 relative to the second cylindrical body 650 can permit rotation of the lenticular lens 640 independently relative to the Fresnel lens 645, thereby facilitating variation of the orientation of the lenticular lens 640 relative to the linear array of light emitting diodes to achieve correct line projection alignment regardless of the focus distance. The example configuration also permits the interchange (exchange) of one lenticular lens for another lenticular lens, which can be useful in achieving configurations with different fan angles and thus different projected line lengths for a given focus distance. It will be understood that while the illustrated example implementation shows a configuration in which the third cylindrical body portion 660 is secured to the second cylindrical body portion 650 by a threaded engagement, other mechanisms may be employed in the alternative, such as snap-fit (friction fit) or hinged attachment.

While the example implementation illustrated in FIGS. 9-17 show a device in which both the Fresnel lens and the lenticular lens are positionable relative to the linear array of light emitting diodes, other example implementations may be provided in which only one of the Fresnel lens and the lenticular lens are variable relative to the linear array of light emitting diodes (e.g. by including two cylindrical body portions instead of three cylindrical body portions).

It will be understood that the cylindrical body portions can be provided with a wide range of diameters. In some example implementations, the outer diameter of the cylindrical body portions may range between 150 mm and 250 mm, or, for example, between 160 mm and 200 mm. In other example implementations, the outer diameter may be greater than 250 mm or smaller than 150 mm. Generally, the larger the diameter, the more light that is collected by the Fresnel lens from the LED board, thereby making the resultant image brighter.

In some example implementations, LEDs may be provided with a beam angle that facilitates capture, by the Fresnel lens, of the emitted light. While conventional LEDs have a spread of 120°, LEDs with a greater or smaller angular spread may be employed. For example, LEDs with an angular spread less than 90°, less than 80°, less than 70°, less than 60°, less than 50°, less than 40°, less than 30°, less than 20°, or less than 10°, may be employed in the alternative to increase the brightness of the projected image.

Figure 14:
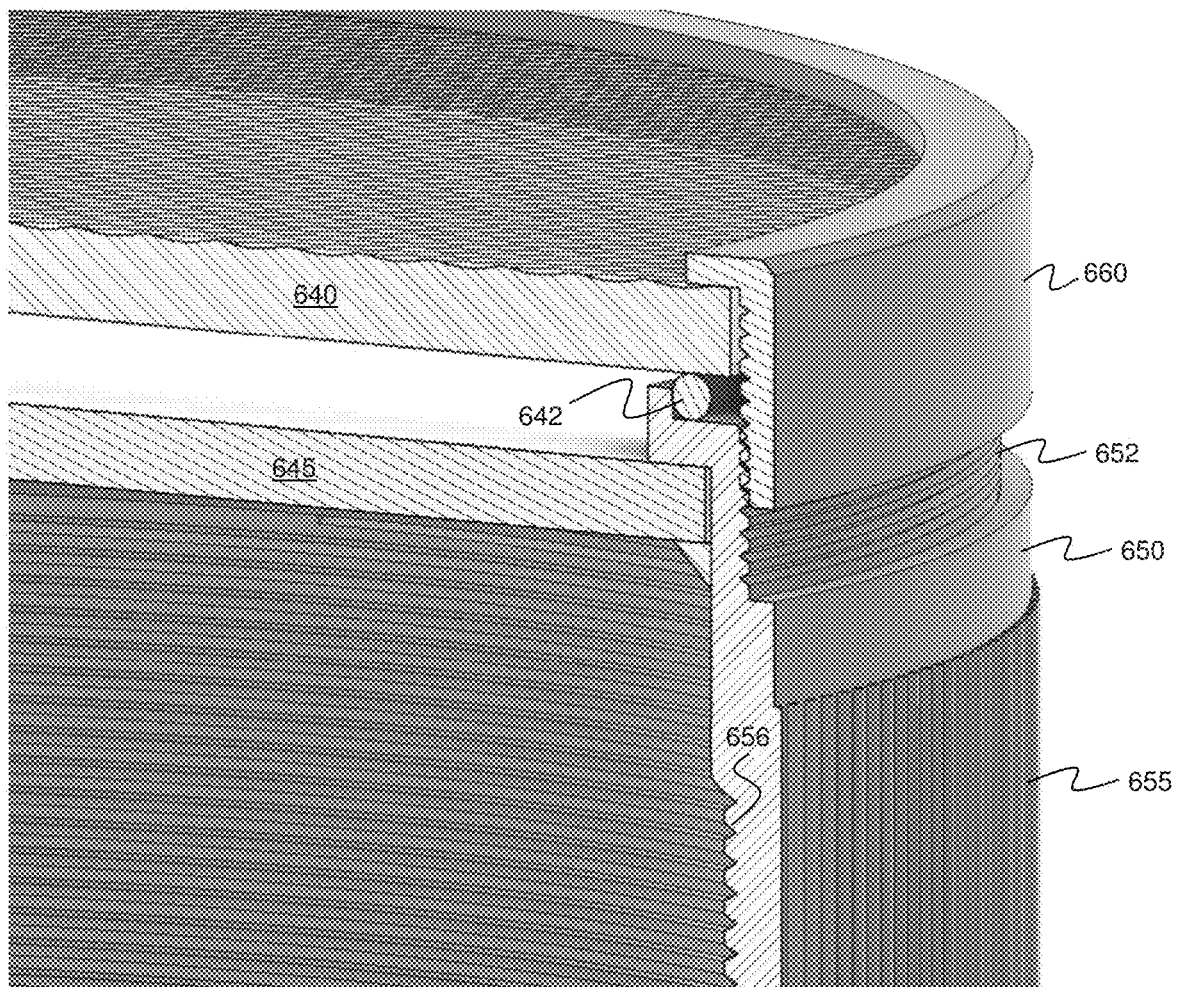
FIG. 14 provides a detailed view showing the engagement of the third cylindrical body portion with the second cylindrical body portion.
Figure 15A:
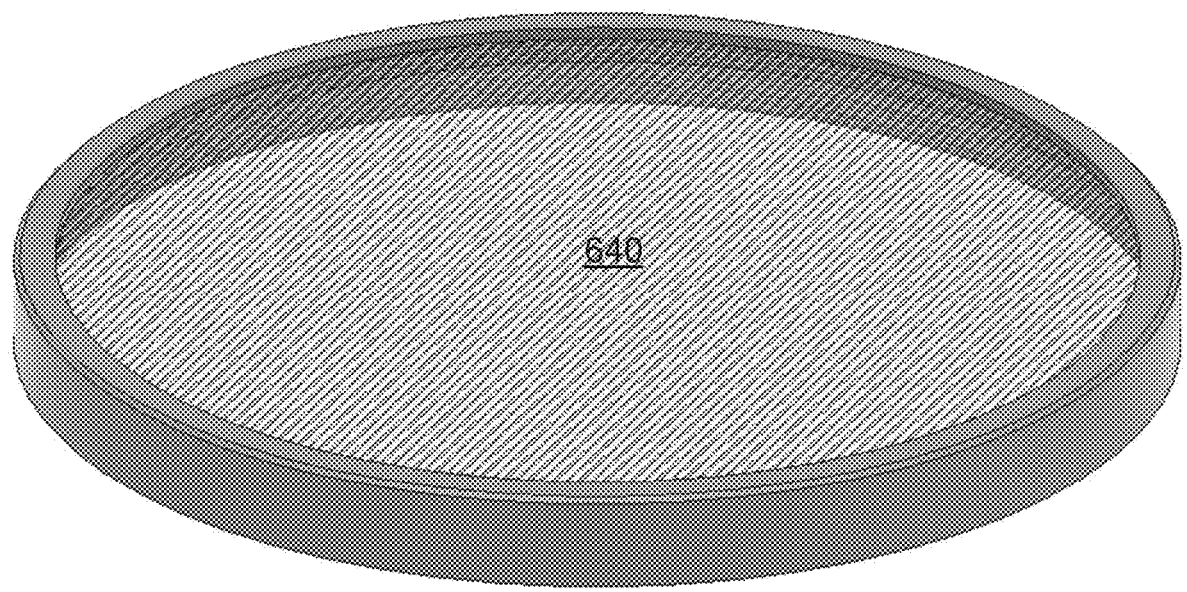
FIGS. 15A and 15B illustrate top and bottom views, respectively, of the third cylindrical body portion.
Figure 15B:
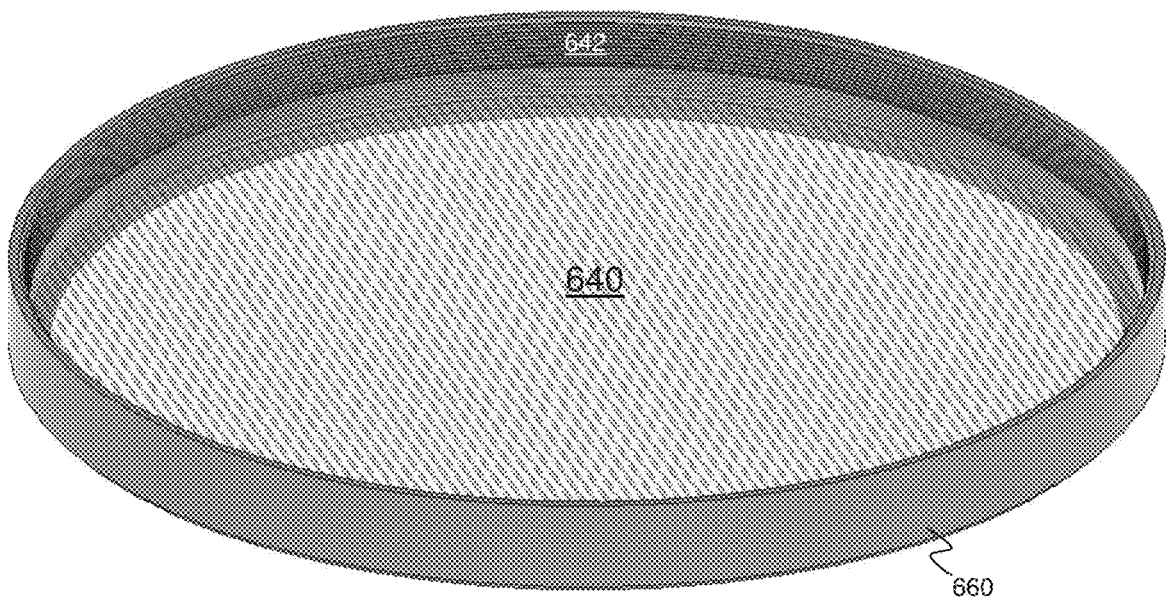
Figure 16:
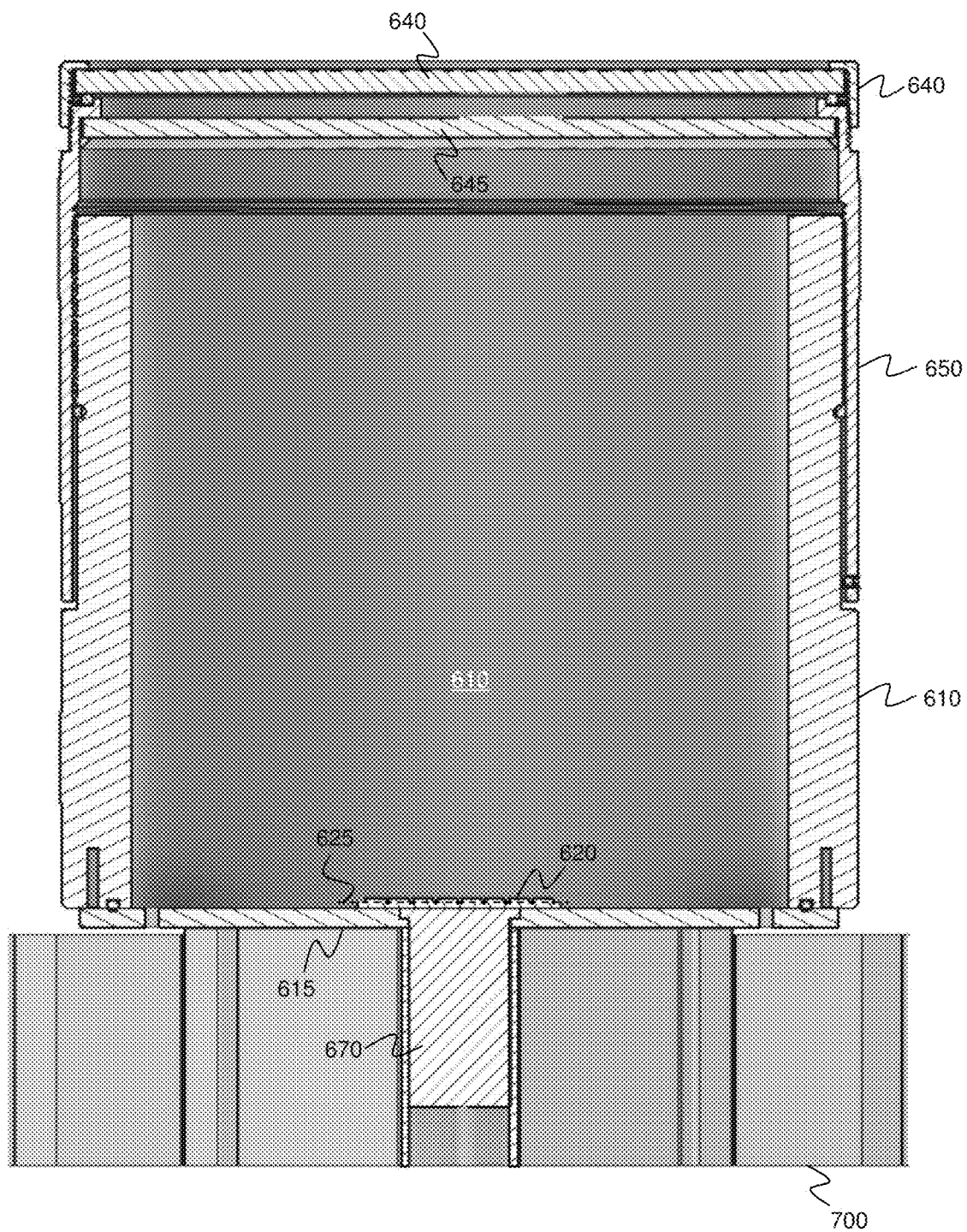
FIGS. 16 and 17 show cross-sectional views of an example implementation of an optical projection device formed from multiple cylindrical housings.
Figure 17:
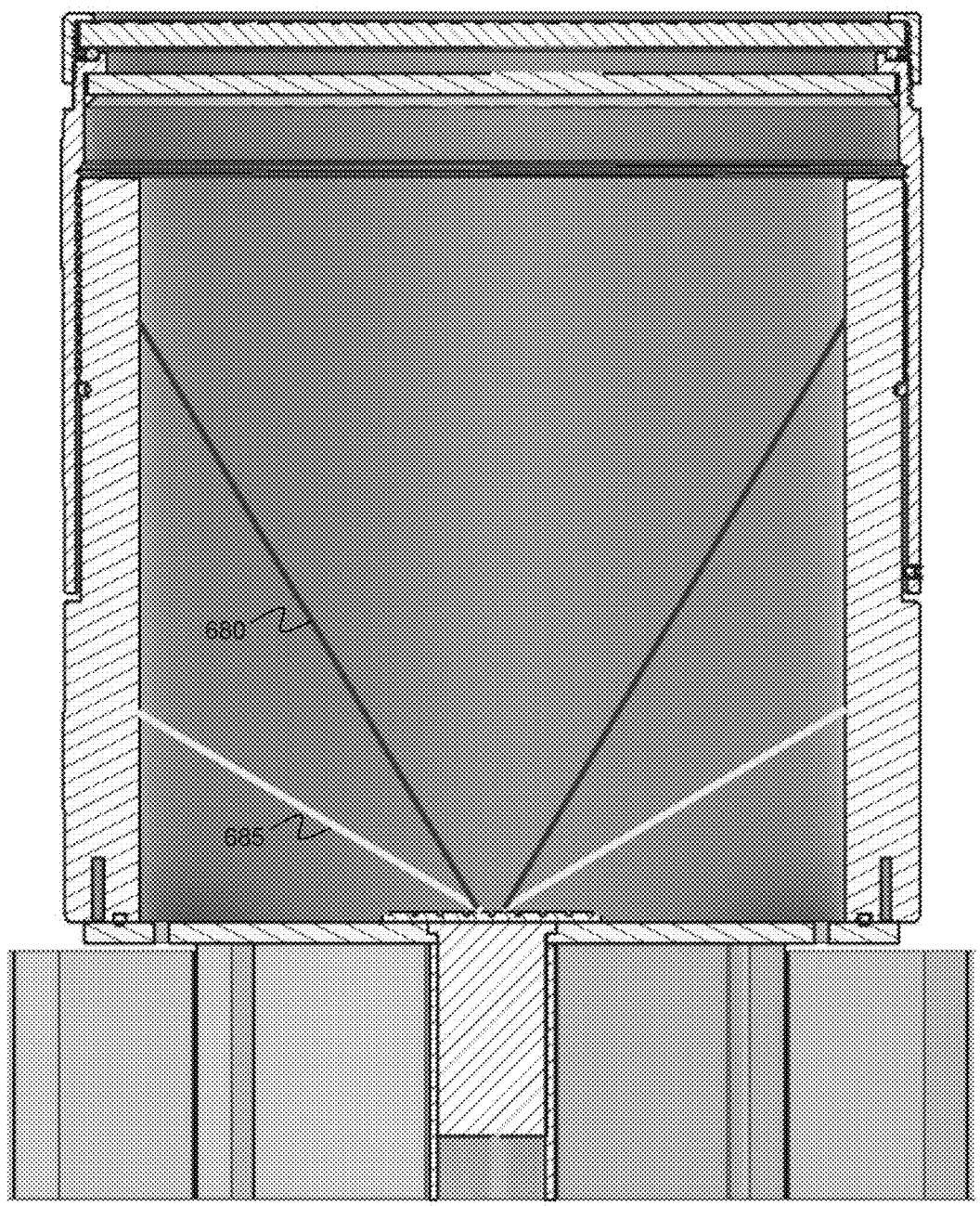

As shown in FIG. 14, an O-ring 642 (or other gasket) may be included that is compressed by the third cylindrical body portion 660 against the second cylindrical body portion 650 to provides water-tight seal. Similarly, an O-ring 614 (or other gasket) may be provided that is compressed when the second cylindrical body portion 650 is engaged with the first cylindrical body portion 610, as shown, for example, in FIGS. 11 and 12.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Therefore what is claimed is:

1. A method of forming a virtual optical marking on a surface, the method comprising:
   providing an optical projection device comprising:
      a housing;
      a linear array of light emitting diodes supported by the housing, the linear array of light emitting diodes defining an array axis intersecting each light emitting diode;
      at least one optical component supported by the housing, the at least one optical component being configured to focus light emitted from the linear array of light emitting diodes and generate a linear image having an image axis parallel to the array axis; and
   supporting the housing relative to the surface such that the linear image is formed on the surface, thereby virtually marking the surface with the linear image; and
   controlling the optical projection device to generate the linear image in response to a signal received by a sensor.

2. The method according to claim 1 wherein the optical projection device is absent of an image mask device between the linear array of light emitting diodes and the at least one optical component.

3. The method according to claim 1 wherein the at least one optical component is configured to collect and transmit the light from the linear array of light emitting diodes such that at least 25% of an optical power emitted by the linear array of light emitting diodes is transmitted to form the linear image.

4. The method according to claim 1 wherein at least one light emitting diode is a high-power light emitting diode consuming an electrical power of at least 5 W.

5. The method according to claim 1 wherein a distance between a distal end of the optical projection device and the linear image formed on the surface is between 7.5 and 60 feet.

6. The method according to claim 1 wherein a distance between a distal end of the optical projection device and the linear image formed on the surface is between 7.5 and 40 feet.

7. The method according to claim 1 wherein a distance between a distal end of the optical projection device and the linear image formed on the surface is between 7.5 and 22.5 feet and an illuminance of the linear image is at least 4000 lux.

8. The method according to claim 1 wherein a distance between a distal end of the optical projection device and the linear image formed on the surface is between 7.5 and 22.5 feet and an illuminance of the linear image is at least 10000 lux.

9. The method according to claim 1 wherein the at least one optical component is configured such that a length of the linear image exceeds a length of an output aperture of said at least one optical component by at least a factor of 10.

10. The method according to claim 1 wherein the at least one optical component comprises a lens configured to focus the light and an optical diffusing component configured to diffuse the light along the image axis.

11. The method according to claim 10 wherein a relative distance between the linear array of light emitting diodes and the lens is controllable for varying a focal distance of the linear image.

12. The method according to claim 10 wherein the lens is a spherical lens.

13. The method according to claim 10 wherein the lens is a cylindrical lens.

14. The method according to claim 10 wherein the optical diffusing component is a lenticular lens.

15. The method according to claim 10 wherein the lens is a Fresnel lens.

16. The method according to claim 15 wherein the optical diffusing component is a lenticular lens.

17. The method according to claim 16 wherein the Fresnel lens and the lenticular lens are formed as a monolithic optical component.

18. The method according to claim 16 wherein the Fresnel lens is positioned adjacent to the lenticular lens.

19. The method according to claim 16 wherein the housing is configured such that the Fresnel lens is movable relative to the linear array of light emitting diodes, the method further comprising moving the Fresnel lens relative to the linear array to focus the linear image on the surface.

20. The method according to claim 16 wherein the housing is configured such that an orientation of the lenticular lens is variable relative to the linear array of light emitting diodes without altering a position of the Fresnel lens, the method further comprising varying the orientation of the lenticular lens to align the image axis.

21. The method according to claim 1 wherein the sensor is a motion sensor.

22. The method according to claim 1 wherein the sensor is a beam break sensor.

23. The method according to claim 1 wherein the sensor is configured to detect motion within a spatial region defined relative to the location where the linear image is formed.

24. The method according to claim 1 wherein the sensor is configured to detect motion within a hazard region.

25. The method according to claim 1 wherein the optical projection device comprises the sensor.

26. The method according to claim 1 wherein the sensor is wirelessly coupled to the optical projection device.

27. An optical projection system for forming a virtual optical marking a surface, said optical projection system comprising:
   optical projection device comprising:
      a housing;
      a linear array of light emitting diodes supported by said housing, said linear array of light emitting diodes defining an array axis intersecting each light emitting diode;
      at least one optical component supported by said housing, said at least one optical component being configured to focus light emitted from said linear array of light emitting diodes and generate a linear image having an image axis parallel to said array axis;
   a sensor; and
   control circuitry operably coupled to said linear array of light emitting diodes and said sensor, wherein said control circuitry is configured to control operation of said linear array of light emitting diodes in response to a signal received from said sensor.

28. The system according to claim 27 wherein the sensor is a motion sensor.

29. The system according to claim 27 wherein the sensor is a beam break sensor.

30. The system according to claim 27 wherein the sensor is configured to detect motion within a spatial region defined relative to the location where the linear image is formed.

31. The system according to claim 27 wherein the optical projection device comprises said sensor.

32. The method according to claim 27 wherein the sensor is wirelessly coupled to the optical projection device.

* * * * *

UNITED STATES PATENT AND TRADEMARK OFFICE
CERTIFICATE OF CORRECTION

Page 1 of 1

PATENT NO. : 11,873,987 B2
APPLICATION NO. : 17/961670
DATED : January 16, 2024
INVENTOR(S) : Dimitry Fedorov It is certified that error appears in the above-identified patent and that said Letters Patent is hereby corrected as shown below:

On the Title Page

The Title and in the Specification Column 1, Lines 1-4 should read as follows:
SYSTEMS AND METHODS FOR CONTROLLING A LINEAR OPTICAL PROJECTION DEVICE BASED ON SIGNALS RECEIVED FROM A SENSOR Signed and Sealed this
Seventeenth Day of September, 2024

Katherine Kelly Vidal
*Director of the United States Patent and Trademark Office*